United States Patent
Leleannec et al.

(10) Patent No.: US 12,401,790 B2
(45) Date of Patent: Aug. 26, 2025

(54) COMBINING ABT WITH VVC SUB-BLOCK-BASED CODING TOOLS

(71) Applicant: INTERDIGITAL MADISON PATENT HOLDINGS, SAS, Paris (FR)

(72) Inventors: Fabrice Leleannec, Betton (FR); Baptiste Esteban, Grossoeuvre (FR); Karam Naser, Mouazé (FR); Gagan Bihari Rath, Rennes (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 106 days.

(21) Appl. No.: 18/019,384

(22) PCT Filed: Jul. 16, 2021

(86) PCT No.: PCT/EP2021/069947
§ 371 (c)(1),
(2) Date: Feb. 2, 2023

(87) PCT Pub. No.: WO2022/028855
PCT Pub. Date: Feb. 10, 2022

(65) Prior Publication Data
US 2023/0336721 A1  Oct. 19, 2023

(30) Foreign Application Priority Data
Aug. 7, 2020 (EP) .................................. 20305913

(51) Int. Cl.
*H04N 19/119* (2014.01)
*H04N 19/176* (2014.01)
(Continued)

(52) U.S. Cl.
CPC .......... *H04N 19/119* (2014.11); *H04N 19/176* (2014.11); *H04N 19/52* (2014.11); *H04N 19/96* (2014.11)

(58) Field of Classification Search
CPC .. H04N 19/119; H04N 19/157; H04N 19/176; H04N 19/52; H04N 19/96; H04N 19/61
See application file for complete search history.

(56) References Cited

U.S. PATENT DOCUMENTS 11,146,810 B2 * 10/2021 Chen .................... H04N 19/521
11,368,703 B2 * 6/2022 Lim ..................... H04N 19/159
(Continued)

FOREIGN PATENT DOCUMENTS

WO  2019245841  12/2019

OTHER PUBLICATIONS

Zheng, Implicit Transform Block Split Process for Asymmetric Partitions, Joint Collaborative Team on Video Coding (JCT-VC) of ITU-T SG 16 WP 3 and ISO/IEC JTC 1/SC 29/WG 11, Document: JCTVC-J0364, 10th Meeting, Stockholm, Sweden, Jul. 11, 2012. (Year: 2012).*

(Continued)

*Primary Examiner* — Dramos Kalapodas
(74) *Attorney, Agent, or Firm* — Ronald Kolczynski

(57) ABSTRACT

Asymmetric binary trees are used in combination with coding tools such as transform unit tiling, affine motion compensation, decoder side motion vector refinement, and bidirectional optical flow. In another embodiment asymmetric binary trees is used in combination with subblock temporal motion vector prediction. Embodiments enable tiling of coding blocks into subblocks in accordance with coding tools such as used in Versatile Video Coding.

20 Claims, 34 Drawing Sheets

(51) Int. Cl.
  *H04N 19/52* (2014.01)
  *H04N 19/96* (2014.01)

(56) References Cited

U.S. PATENT DOCUMENTS

| | | | | |
|---|---|---|---|---|
| 2013/0136175 | A1* | 5/2013 | Wang | H04N 19/11 |
| | | | | 375/240.12 |
| 2020/0204820 | A1* | 6/2020 | Zhang | H04N 19/52 |
| 2020/0288150 | A1* | 9/2020 | Jun | H04N 19/46 |
| 2021/0029370 | A1* | 1/2021 | Li | H04N 19/573 |

OTHER PUBLICATIONS

Zheng, Implicit Transform Block Split Process for Asymmetric Partitions, Joint Collaborative Team on Video Coding (JCT-VC) of ITU-T SG 16 WP 3 and ISO/IEC JTC 1/SC 29/WG 11, Document: JCTVC-J0364, 10th Meeting, Stockholm, Sweden, Jul. 11, 2012, 4 pages.

Bordes et al., Description of SDR, HDR and 360 Video Coding Technology Proposal by Qualcomm and Technicolor—Medium Complexity Version, 10. JVET Meeting, Oct. 4, 2018-20-40-2018; San Diego, The Joint Video Exploration Team of ISO/IEC JTC1/SC29/WG11 and ITU-T SG. 16, JVET-0022, Apr. 3, 2018, 81 pages.

Leleannec et al., EE2 Related: Asymmetric Binary Tree Splitting on Top of VVC, 22. JVET Meeting, Apr. 20, 2021-Apr. 28, 2021, Teleconference, (The Joint Video Exploration Team of ISO/IEC JTC1/SC29/WG11 and ITU-T SG. 16, No. JVET-V0083, M56491—Apr. 22, 2021, 9 pages.

Bross et al., Versatile Video Coding (Draft 10), Document JVET-S2001_vG, Joint Video Exploration Team of ISO/IEC JTC1/SC29/WG11, 19th meeting, Teleconference, (2020).

High Efficiency Video Coding, Series H: Audiovisual and Multimedia Systems Infrastructure of Audiovisual Services—Coding of Moving Video, ITU-T Telecommunication Standardization Sector of ITU, H.265 (Apr. 2015), 634 pages.

Chen et al., Algorithm Description of Joint Exploration Test Model 3 (JEM3), Joint Video Exploration Team (JVET) of ITU-T SG16 WP3 and ISO/IEC JTC1/SC29/WG11, Document: JVET-C1001 v3, 3rd Meeting, Geneva, Switzerland, May 26, 2016, 37 pages.

* cited by examiner

HOR_TRIPLE               VER_TRIPLE

COMBINING ABT WITH VVC SUB-BLOCK-BASED CODING TOOLS

CROSS REFERENCE TO RELATED APPLICATIONS

This application is a U.S. National Stage Application under 35 U.S.C. 371 of International Patent Application No. PCT/EP2021/069947, filed Jul. 16, 2021, which is incorporated herein by reference in its entirety.

This application claims the benefit of European Application No. 20305913.4, filed Aug. 7, 2020, which is incorporated herein by reference in its entirety.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for using asymmetric binary trees with sub-block based coding tools, as in the VVC (Versatile Video Coding or H.266) standard.

According to a first aspect, there is provided a method. The method comprises steps for partitioning a block of a video image into subblocks of size in correspondence with one or more coding tools; and encoding the video block using said one or more coding tools.

According to a second aspect, there is provided a method. The method comprises steps for parsing a video bitstream to determine subblock sizes; and decoding the video block using one or more decoding tools on said subblocks of said determined sizes.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The embodiments described here are in the field of video compression and generally relate to video compression and video encoding and decoding more specifically combining Asymmetric Binary Tree partitioning with VVC sub-block based coding tools.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, a picture is divided into so-called Coding Tree Units (CTU), with typical sizes of 64×64, 128×128, or 256×256.

Figure 1:
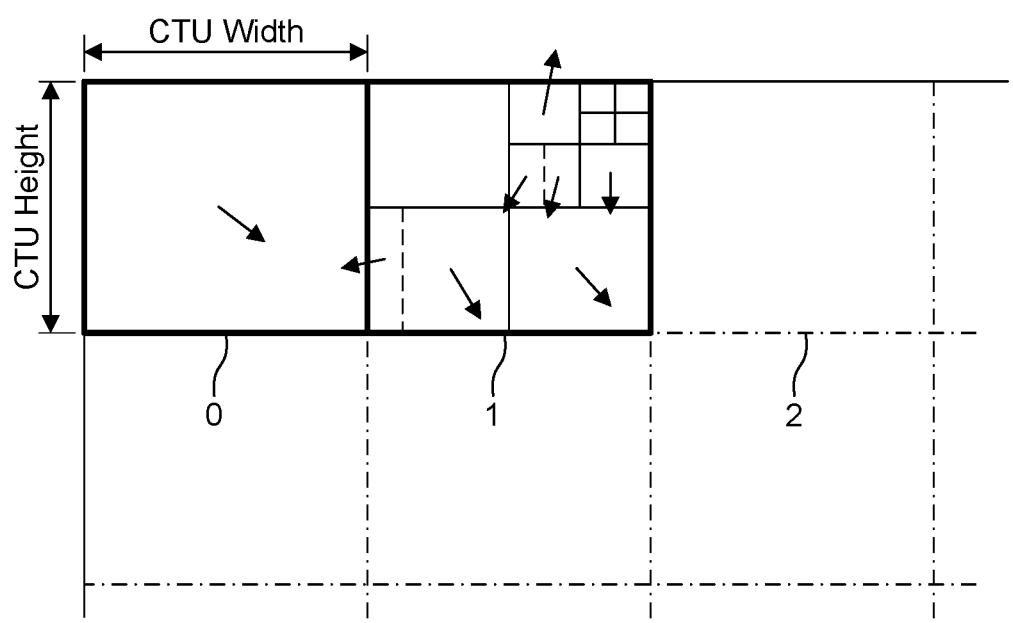
FIG. 1 shows Coding Tree Unit and Coding Tree concepts to represent a compressed HEVC picture.

Each Coding Tree Unit (CTU) is represented by a Coding Tree in the compressed domain. This is a quad-tree division of the CTU, where each leaf is called a Coding Unit (CU), as shown in FIG. 1.

Figure 2:
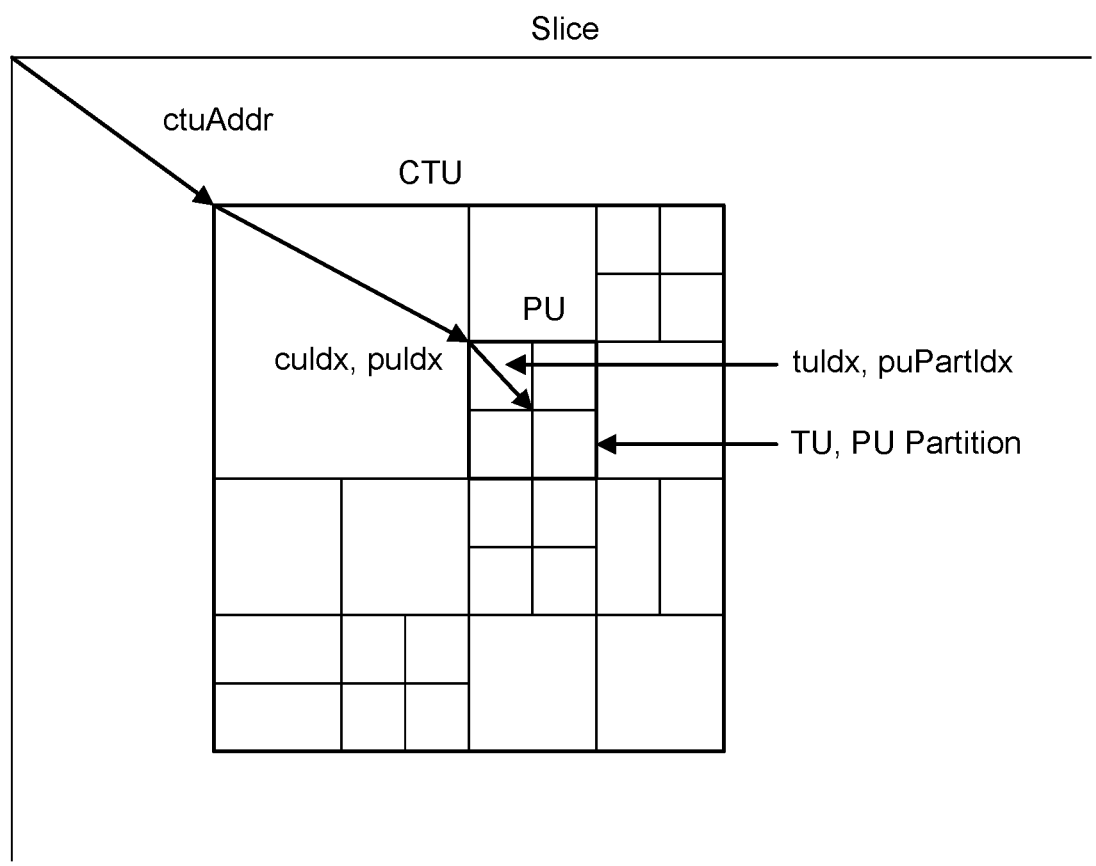
FIG. 2 shows an example division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. A motion vector is associated to each prediction unit (PU). The Intra or Inter coding mode is assigned on the CU level, as shown in FIG. 2.

Figure 3:
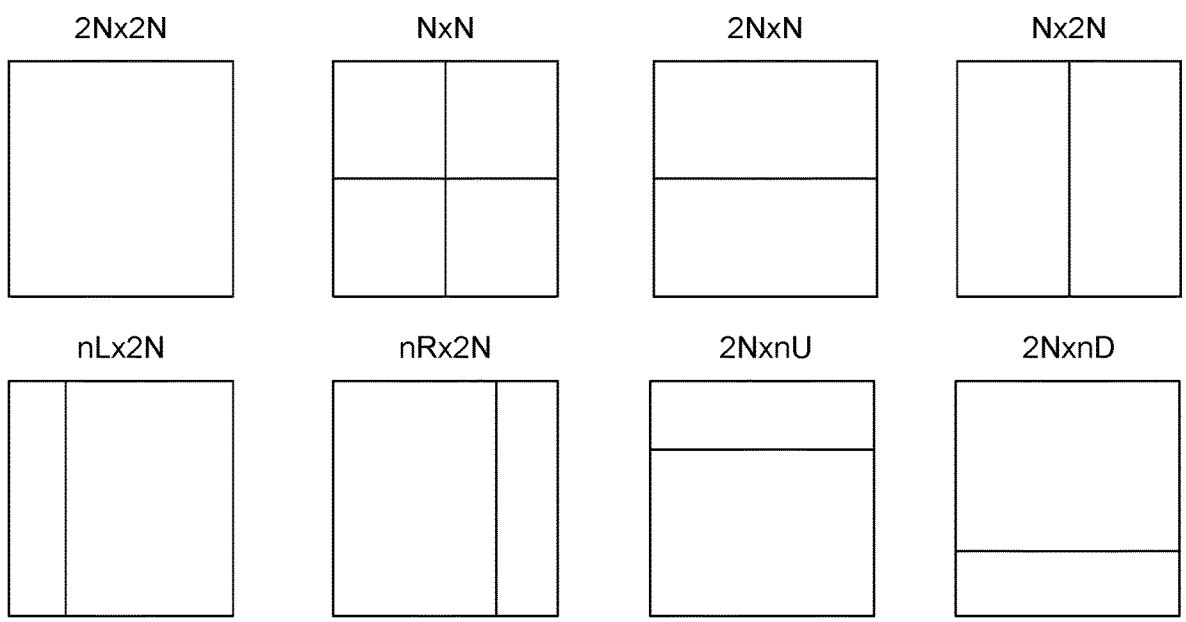
FIG. 3 shows partitioning of coding units into prediction units.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3. According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools of VVC include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

Figure 4:
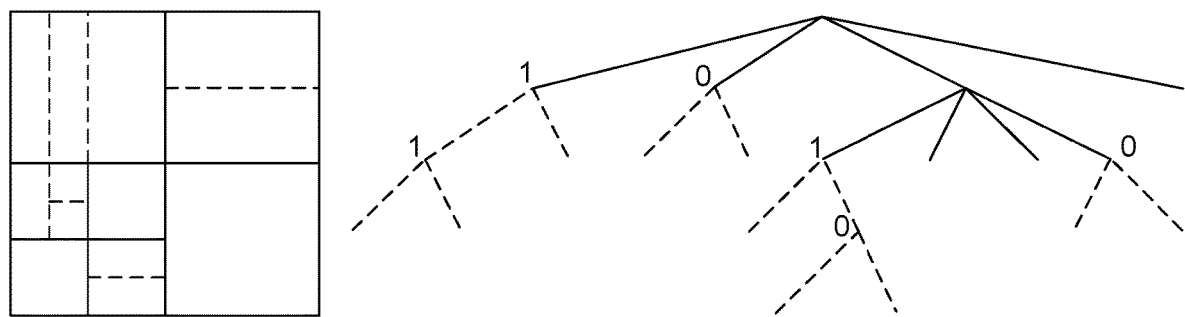
FIG. 4 shows an example of Quad-Tree Plus Binary-Tree (QTBT) CTU representation.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In addition to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed. In other words, each Coding Unit is systematically made of a single prediction unit (previously 2N×2N prediction unit partition type) and single transform unit (no division into a transform tree).

For most coding units in VVC draft 6, for most CU coding modes, no more CU partitioning into predictions units or transform unit is employed. In other words, each Coding Unit is systematically made of a single prediction unit (2N×2N prediction unit partition type) and single transform unit (no division into a transform tree). This is true for all VVC coding units except in 4 specific coding modes of VVC draft 6, where the following PU or TU partitioning applies.

In the case of a CU larger than 64 in width or height, a tiling of the CU into TU of size equal to the maximum supported transform size is performed. Typically, the maximum transform size may be equal to 64.

In the case of an intra CU coded in ISP (intra sub-partition) mode, the CU is split into 2 or 4 transform units, depending on the type of ISP mode used and the shape of the CU.

In the case of an inter CU coded in SBT (sub-block transform) mode, the CU is split into 2 transform units, one of the resulting TU having necessarily residual data equal to zero.

In the case of an inter CU coded in Triangle Prediction Merge (TPM) mode, the CU is made of 2 triangular prediction units, each PU being assigned its own motion data.

Figure 5:
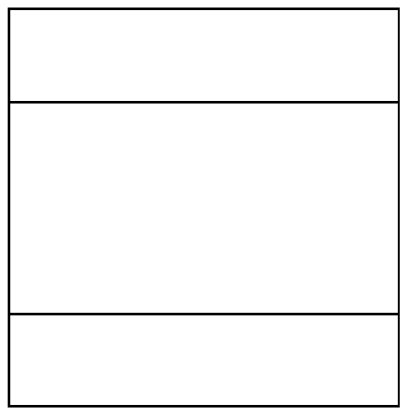
FIG. 5 shows horizontal (left) and vertical (right Triple Tree Coding Unit splitting modes.
Figure 5:
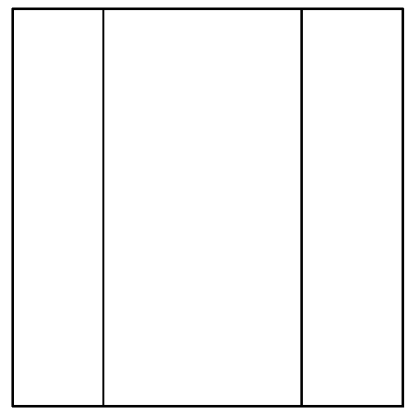

An additional CU split mode adopted in the VVC (Versatile Video Coding) video compression standard, called the horizontal or vertical triple tree splitting mode, consists in dividing a coding unit (CU) into 3 sub-coding-units (sub-CUs), with respective sizes equal to ¼, ½ and ¼ of the parent CU size in the direction of the considered spatial division. This is illustrated in FIG. 5.

Figure 6:
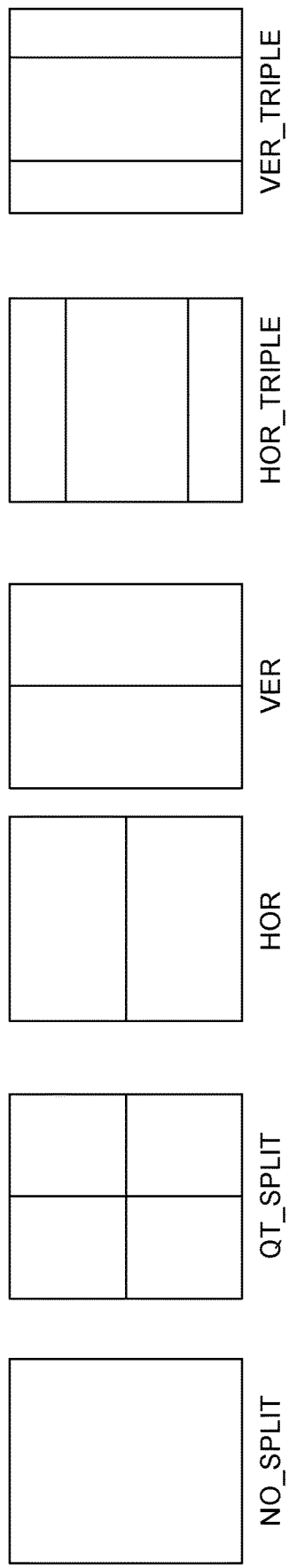
FIG. 6 shows a set of all Coding Unit splitting modes supported in the video coding scheme considered in the description.
Figure 7:
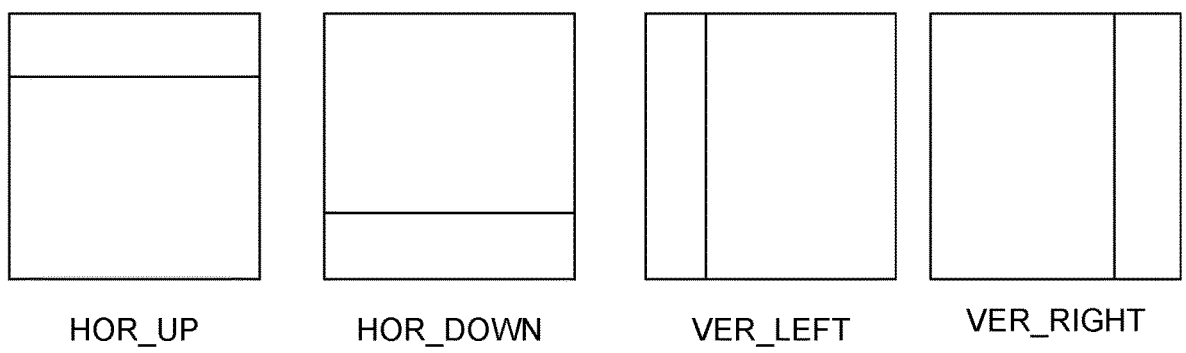
FIG. 7 shows additional CU binary asymmetric splitting modes introduced by the ABT coding tool.

The complete set of CU splitting modes present in such codec are shown in FIG. 6.

In another disclosure, it is proposed to introduce Coding Units with new rectangular shapes, which result from a new Binary Splitting Mode called asymmetric splitting mode.

This means new rectangular CU shapes are added. These new shapes consist in sizes equal to $3 \cdot 2^n$ in width and/or height. Furthermore, a CU with a size multiple of 3 in width or height can be further split in a binary fashion, horizontally or vertically.

As a consequence, a square coding unit with size (w, h) (width and height) that would be split through one of the proposed asymmetric binary splitting modes, for example HOR_UP (horizontal-up), would lead to 2 sub-coding units with respective rectangular sizes $$\left(w, \frac{h}{4}\right) \text{ and } \left(w, \frac{3h}{4}\right).$$

Figure 8:
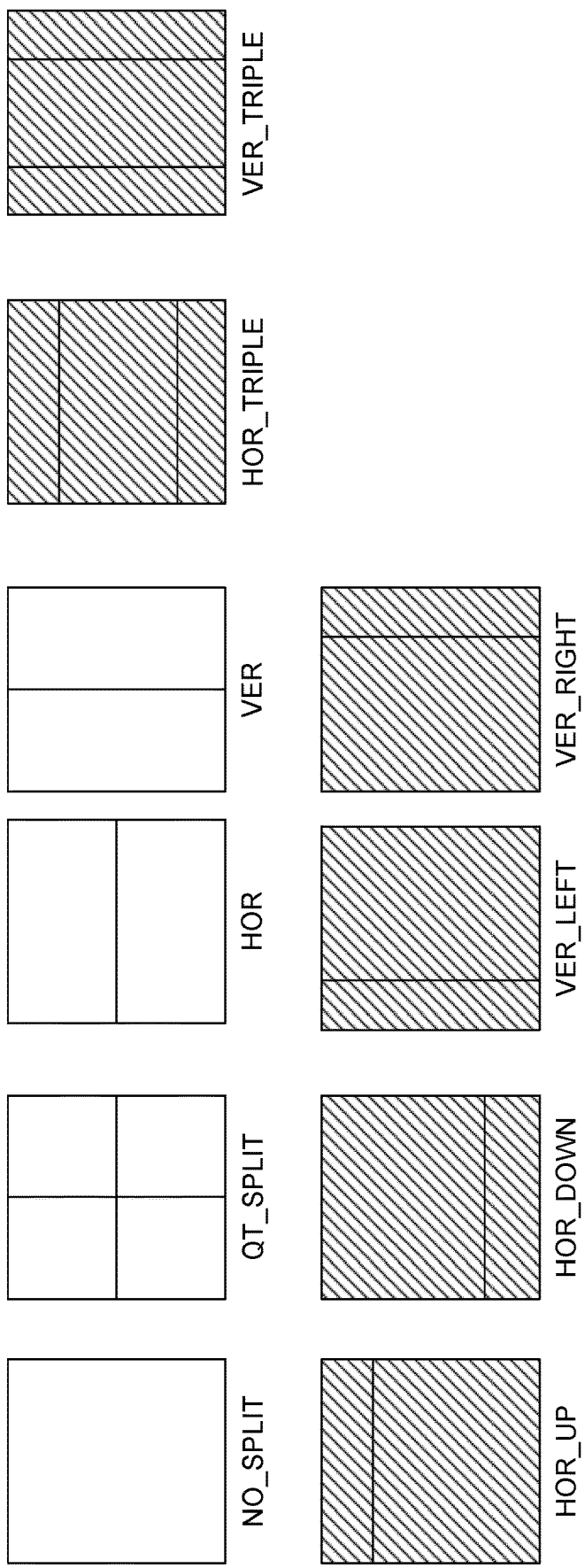
FIG. 8 shows an extended set of possible CU split modes, including the horizontal and vertical triple tree split mode.

When using all split modes from VVC and all ABT (Asymmetric Binary Tree) split modes, the set of possible partitions supported in the envisioned coding scheme is given in FIG. 8. Triple tree consists in splitting a CU into tree sub-CU with size (¼, ½, ¼) relative to the parent CU, in the considered orientation.

Figure 9:
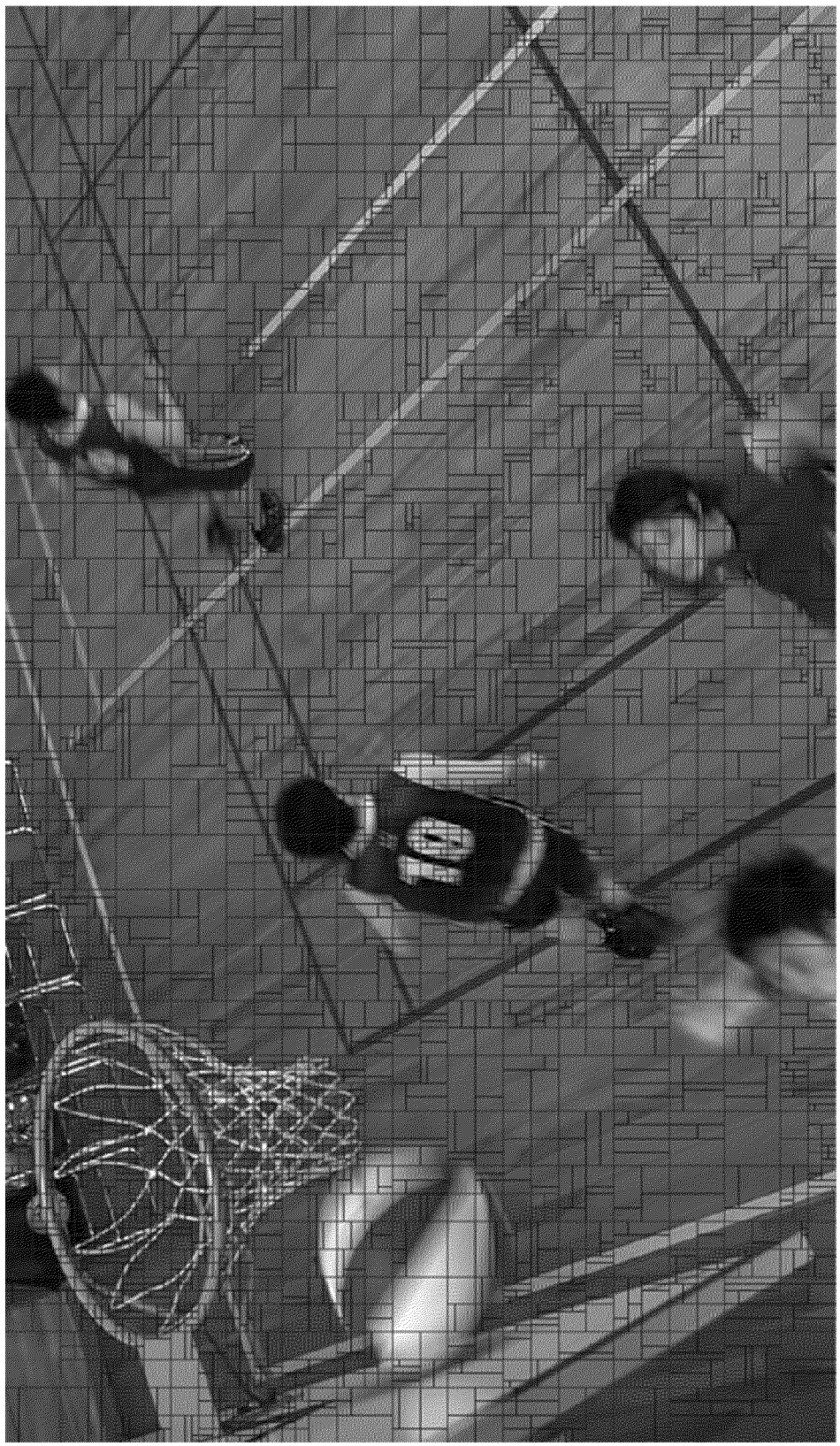
FIG. 9 shows an example of coding structures chosen to encode an exemplary picture, including a Quad-Tree decomposition of CTUs and Binary-Tree decomposition that is embedded into the quad tree.

FIG. 9 illustrates the coding units chosen by the encoder. One sees that triple tree and asymmetric binary tree split modes are often used in this exemplary picture. One also notes that these additional coding unit topologies help in having coding structures that spatially match the structures and discontinuities contained in the original signal.

The present invention proposes some adaptations of some VVC coding tools, when introducing the Asymmetric Binary Tree (ABT) split modes on top of the VVC draft 10 compression system.

These adaptations include the synergy of ABT with coding tools contained in the VTM which were not contained in the coding schemes contained in JEM3, JVET-J0022.

One problem solved by this invention is how to efficiently combine the use of ABT partitioning with tools specific in the VVC draft 10 specification, which were not present in the former codecs where ABT has already been proposed (JEM3, JVET-J0022).

This description proposes several ways to jointly use the ABT partitioning mode and some VVC specific coding tools. These specific VVC tools addressed here comprise the following ones.

TU tiling
Affine Motion Compensation
DMVR (Decoder Side Motion Vector Refinement)
BDOF (Bi-Directional Optical Flow)

TU Tiling in VVC and Proposed Synergy with ABT

Figure 12:
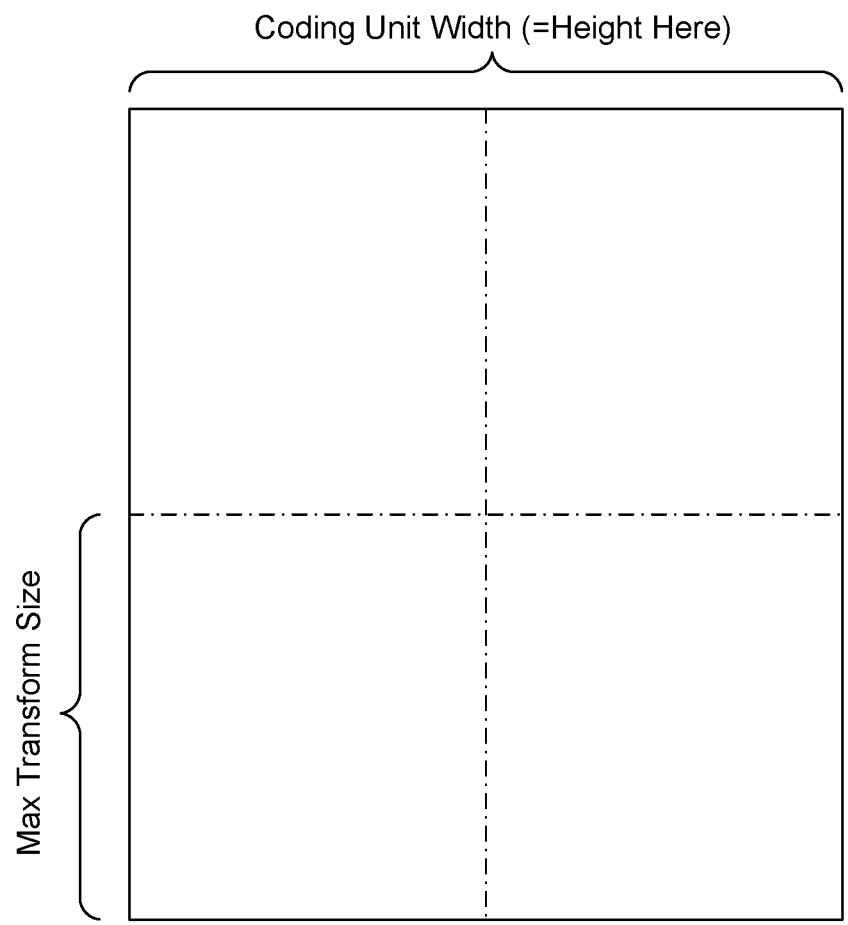
FIG. 12 shows automatic CU tiling into Transform Units in VVC in case the CU size is higher than the max transform size.

This section deals with automatic tiling of coding units into transform units. The VVC standard automatically splits coding units (CUs) with size larger than the maximum transform size supported in the considered VVC bit-stream into transform units. To do so, a CU which size is larger than the maximum transform size along one direction (width or height), is partition into Tus of equal size equal to the maximum transform size in that direction. This is illustrated in FIG. 12.

In the case of ABT, a CU may have a size not equal to a power of two, thus not a multiple of the maximum transform size, which is typically 64 or 32. In that case, a solution for tiling such CUs properly in Tus has to be done.

Several variants are proposed here for that. The first, most straightforward one, consists in dividing the CUs into TUs of size equal to the maximum transform size in the concerned direction, except the last TUs that takes the size of the remaining block part that is less than the max transform size. This corresponds to the TU on the right of the CU (case of FIG. 13), or the bottom-most TU in the case of the vertical direction.

Figure 14:
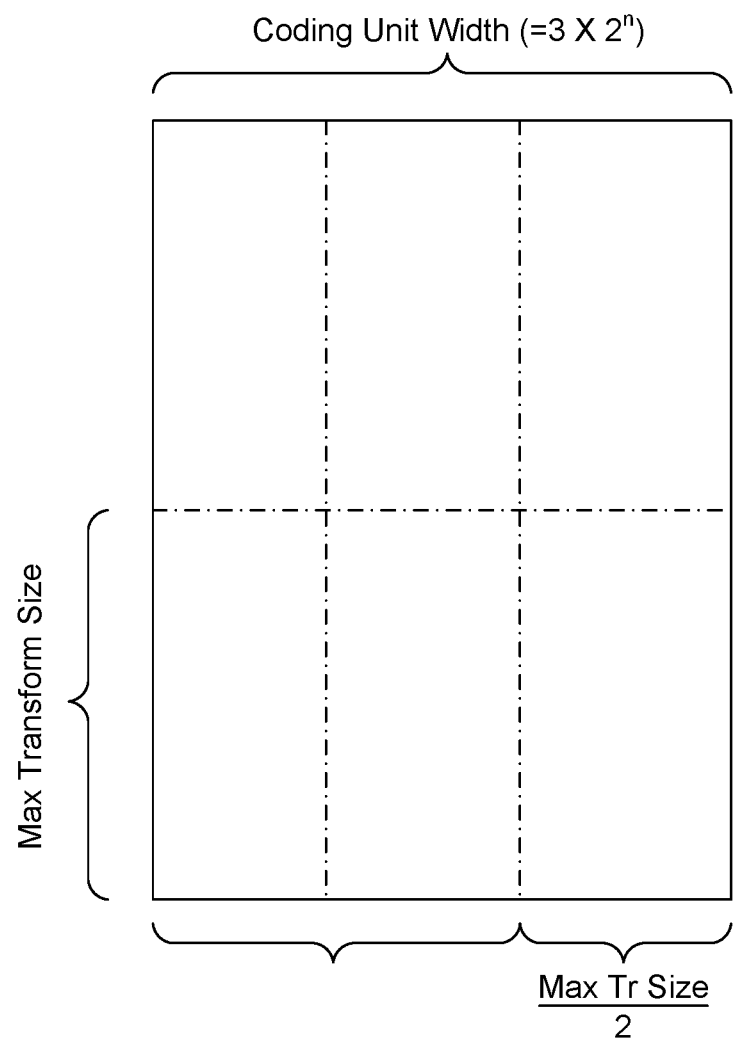
FIG. 14 shows a second proposed alternative embodiment for automatic TU tiling in case the CU size is a multiple of three in width or height.

An alternative embodiment may consist in dividing the considered CU into 3 TUs of equal size, as illustrated by FIG. 14, since the considered CU size is a multiple of 3.

Figure 15:
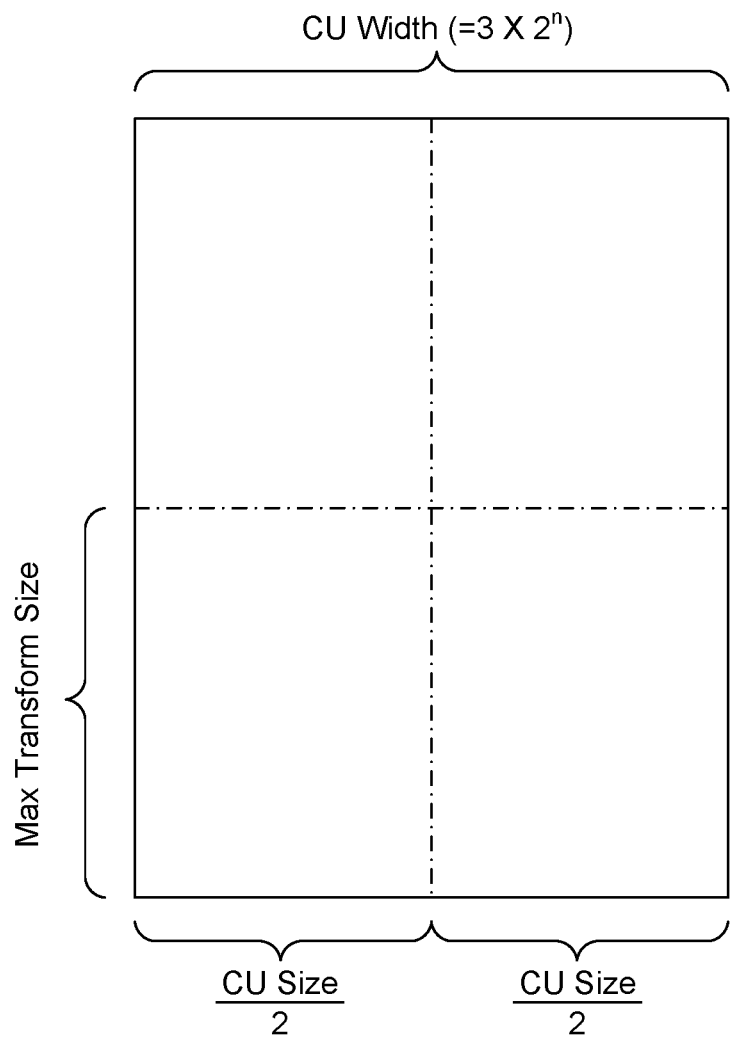
FIG. 15 shows a third proposed alternative embodiment for automatic TU tiling in case the CU size is a multiple of three in width or height.

An alternative embodiment may consist in dividing the considered CU into 2 parts of equal size, as illustrated by FIG. 15, in case the results Tus size is greater or equal to the minimum TU size supported.

Figure 16:
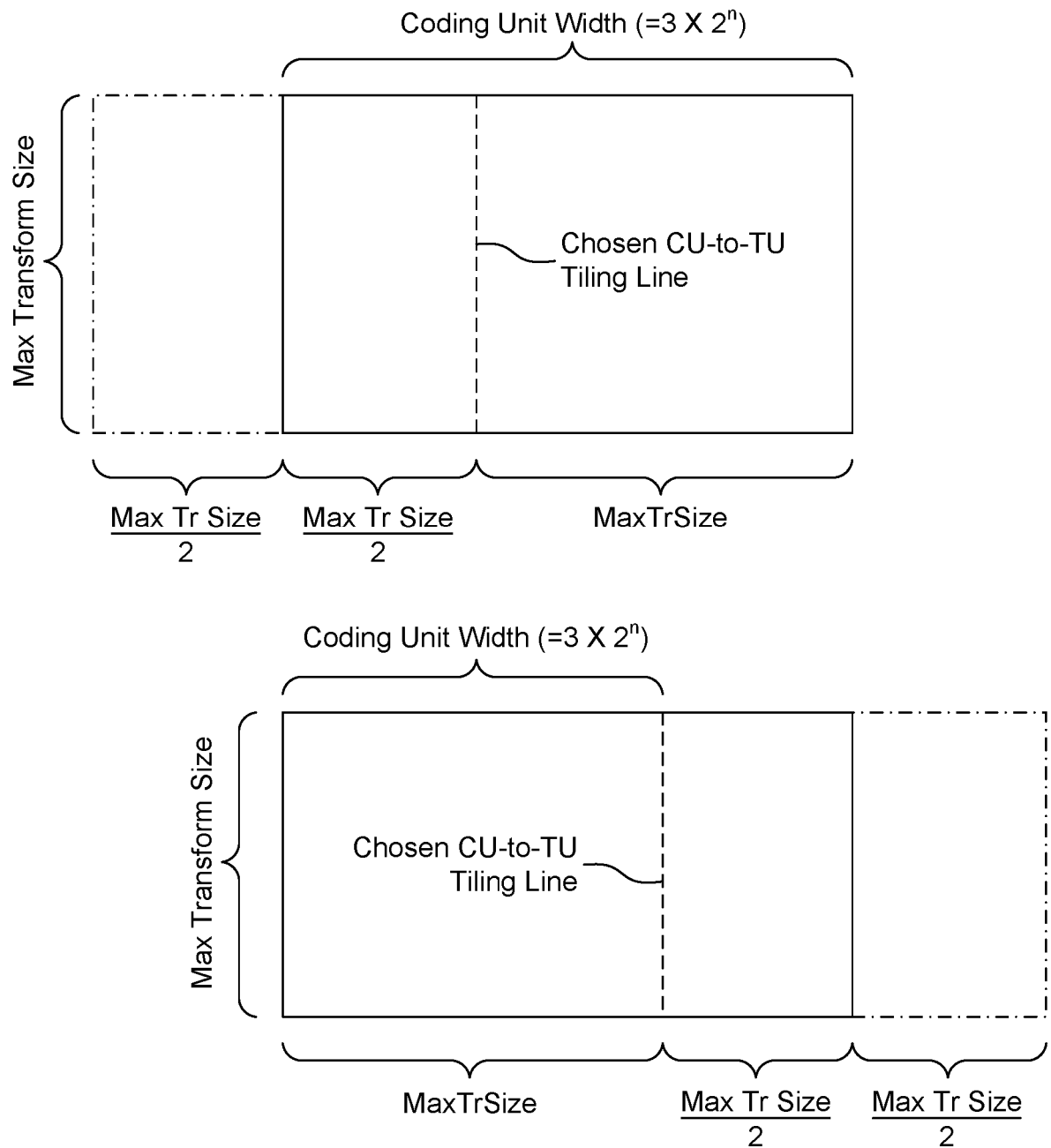
FIG. 16 shows other proposed alternative embodiments for automatic TU tiling in case the CU size is a multiple of three in width or height.

Finally, a last variant comprises choosing the tiling of the considered CU into TUs in a way that ensures the resulting Tus are all fully contained in a square area corresponding to a regular grid of the picture with a granularity equal to the maximum transform size in width and height. This is illustrated in FIG. 16. In this figure, the light dashed line illustrates the maximum TU grid. The CU to split is not aligned to this grid, since the CU has size $3 \times 2^n$. In this case, the tiling into Tus is chosen in a way that the two resulting Tus are fully contained in cell of 64×64 grid (in case the max Tr size is 64) or 32×32 grid (in case the max Tr size is 32×32).

According to a last variant, the same approach as that of FIG. 16 is employed, but with a fixed size of 64×64 cells (corresponding to a Virtual Pipeline Decoding Unit used for some hardware decoder implementation), regardless the value of the maximum transform size.

Affine Motion Compensation

Affine Motion Compensation as Specified in VVC Draft 7

In VVC, some richer motion models than purely translational are supported to improve temporal prediction. To do so, a PU can be spatially divided into sub-PU and a richer model can be used to assign each sub-PU a dedicated motion vector.

A CU is no more divided into PU or TU, and some motion data is directly assigned to each CU. In this new codec design, a CU can be divided into sub-CU and a motion vector can be computed for each sub-CU.

One of the new motion models introduced in VVC is the affine model, which basically consists in using an affine model to represent the motion vectors in a CU.

Figure 17:
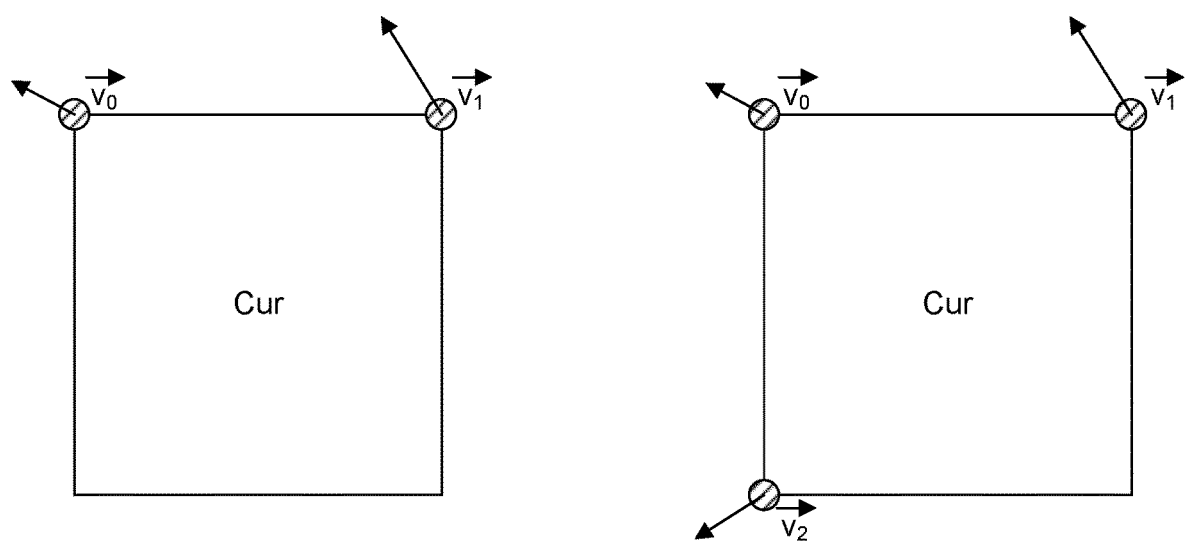
FIG. 17 shows simple affine models used in the Joint Exploration Model and VTM.
Figure 18:
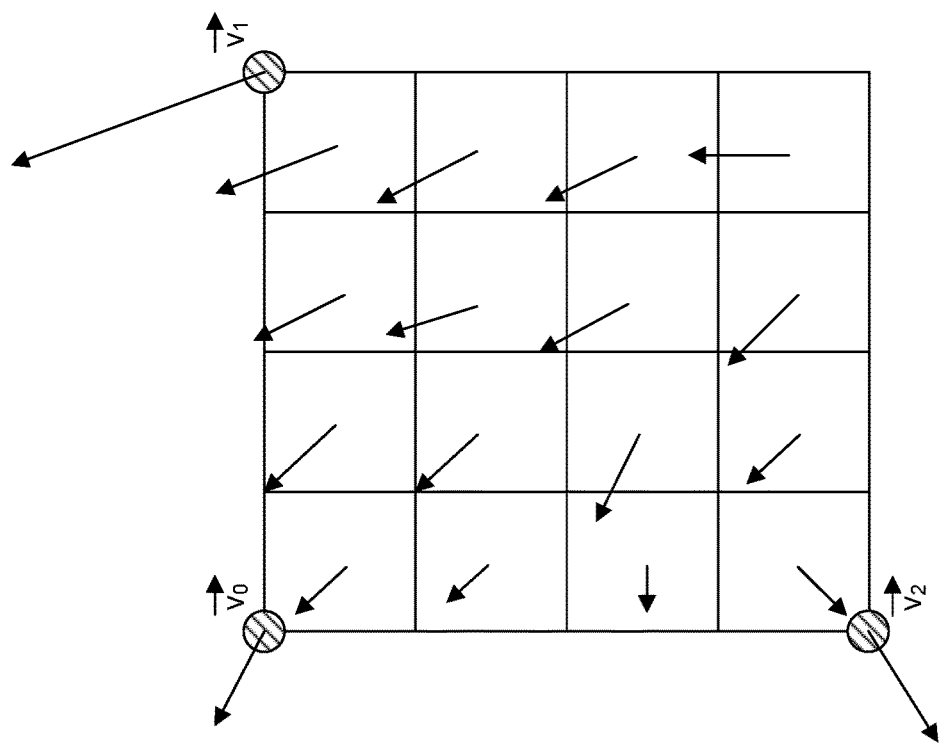
FIG. 18 shows 4×4 sub-CU based affine motion vector field.
Figure 18:
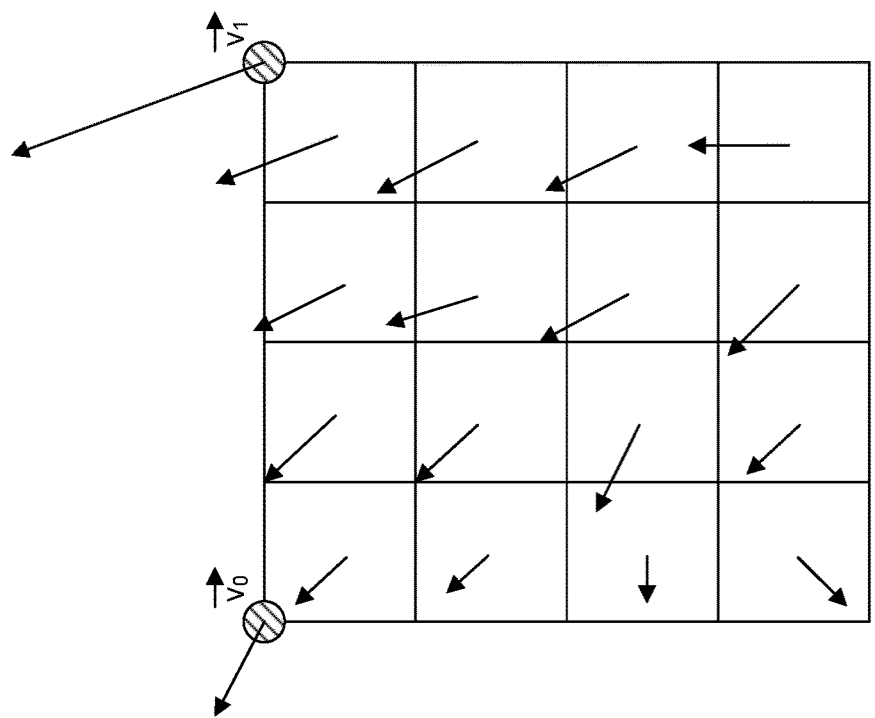

The motion models used are illustrated by FIG. 17 for 2 or 3 control points. The affine motion field for 2 control points, also called the 4-parameter affine model, consists in the following motion vector component values for each position (x, y) inside the considered block:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad \text{Equation 1}$$

4-parmeter affine model used to generate the motion field inside a CU to predict Where $(v_{0x}, v_{0y})$ and $(v_{1x}, v_{1y})$ are the so-called control point motion vectors used to generate the affine motion field. $(v_{0x}, v_{0y})$ is the motion vector top-left corner control point. $(v_{1x}, v_{1y})$ is the motion vector top-right corner control point.

The Equation 1, may be written as Equation 2 by using Equation 3:

$$\begin{cases} v_x = ax - by + v_{0x} \\ v_y = bx + ay + v_{0y} \end{cases} \quad \text{Equation 2}$$

4-parameter affine model used to represent the sub-block based motion field of a CU coded in 4-parameter affine mode $$a = \frac{(v_{1x} - v_{0x})}{w} \quad b = \frac{(v_{1y} - v_{0y})}{w} \quad \text{Equation 3}$$

affine model parameters for a 4-parameter affine model

A model with 3 control points, called the 6-parameter affine motion model, can also be used to represent the sub-block-based motion field of a given coding unit. The motion field in the case of the 6-parameter affine model is computed as in $$\begin{cases} v_x = \frac{(v_{1x} - v_{0x})}{w} x + \frac{(v_{2x} - v_{0x})}{h} y + v_{0x} \\ v_y = \frac{(v_{1y} - v_{0y})}{w} x + \frac{(v_{2y} - v_{0y})}{h} y + v_{0y} \end{cases} \quad \text{Equation 4}$$

6-parameter affine motion field used to represent the sub-block-based motion field of a CU coded in 6-parameter affine mode $$\begin{cases} v_x = ax + cy + v_{0x} \\ v_y = bx + dy + v_{0y} \end{cases} \quad \text{Equation 5}$$

alternatvie expression of the 6-parameter affine motion field $$c = \frac{(v_{2x} - v_{0x})}{h} \quad d = \frac{(v_{2y} - v_{0y})}{h} \quad \text{Equation 6}$$

affine model parameters for a 6-parameter affine model

In practice, to keep complexity reasonable, the same motion vector is computed for each sample of 4×4 sub-block (sub-CU) of the considered CU, as illustrated in FIG. 6. An affine motion vector is computed from the control point motion vectors, at the position of the center of each sub-block. The obtained motion vector (MV) is represented at ¹⁄₁₆-pel accuracy.

As a result, the prediction unit (PU) of a coding unit in the affine mode is built through the motion compensated prediction of each sub-block with its own motion vector.

Combination of Affine Motion Compensation and ABT

As has been explained above, affine motion compensation is performed on a 4×4 sub-block basis in VVC. When introducing ABT into the VVC codec, it happens that some chroma coding block may not have a size equal to a multiple of 4. This is the case for chroma coding block with size equal to 6 in width or height.

In such case, no regular 4×4 sub-block division of the coding block can be done. Consequently, some choice has to be made on how to properly divide the CU into sub-block for affine motion compensation.

Figure 19:
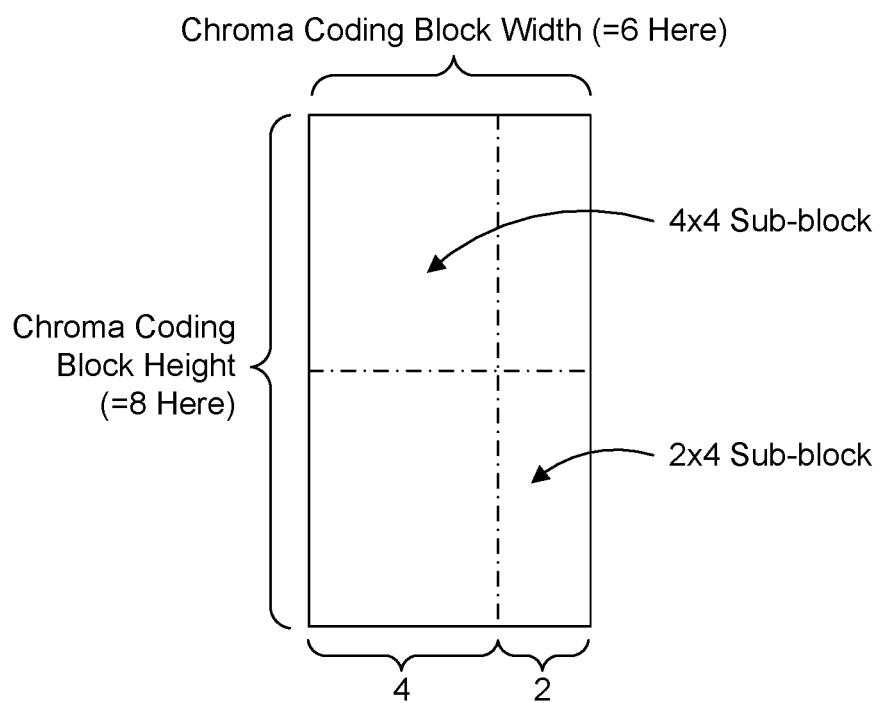
FIG. 19 shows a first proposed method for sub-block division for affine motion compensation.

A first solution is given by FIG. 19. It consists in generating 4×4 subblocks, except for the last line or row of subblocks which have size 2 in the direction where the CU has a non-power-of-2 size.

Figure 20:
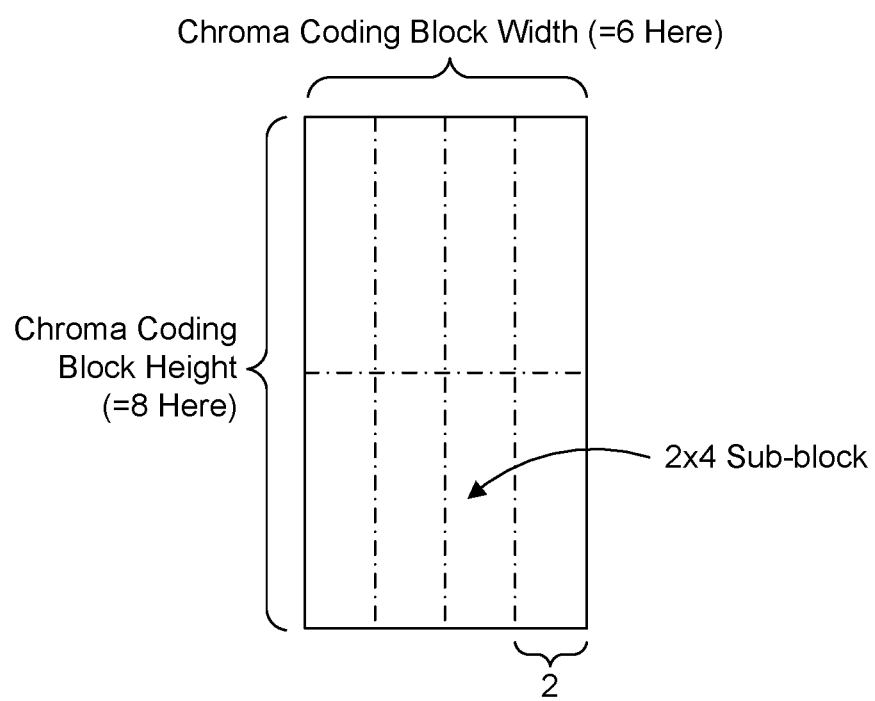
FIG. 20 shows an alternative proposed method for sub-block division of an affine chroma coding block of size six in width or height.
Figure 21:
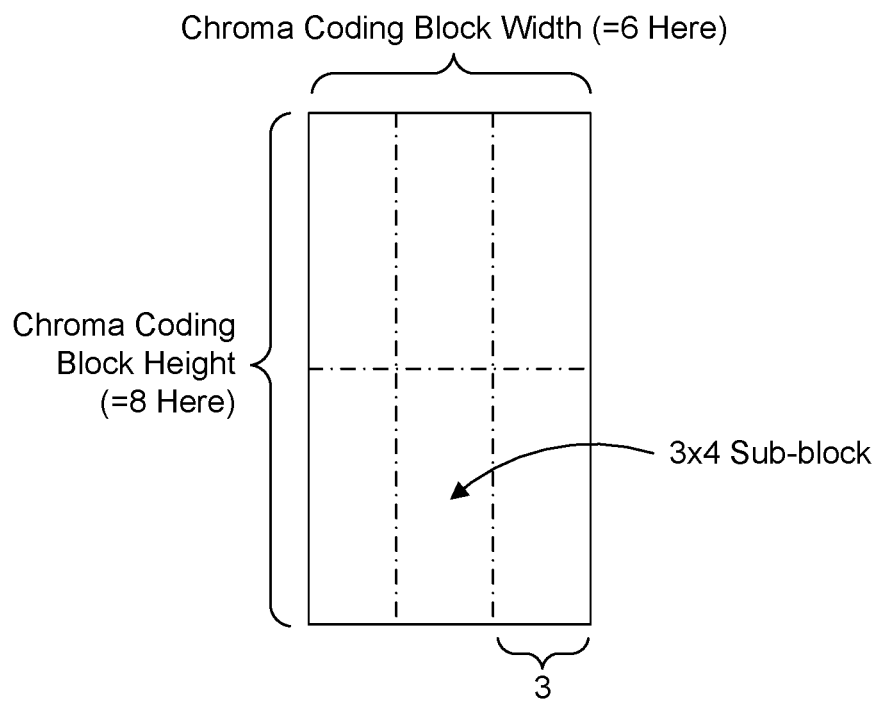
FIG. 21 shows another further alternative method for sub-block division when a chroma coding block is size six in width or height.

An alternative solution may consist in dividing the CU according to a regular grid of sub-blocks of size 2 in the direction where the CU size is not a power-of-two. This is shown on the example of FIG. 20. Another variant is to divide the CU into sub-block of size 3 in the direction where the CU size is a multiple of 3. This is shown in FIG. 21.

Another aspect to handle in affine compensation in chroma block of size 6 is the computation of the final motion vector used for some sub-blocks in the coding block.

Figure 22:
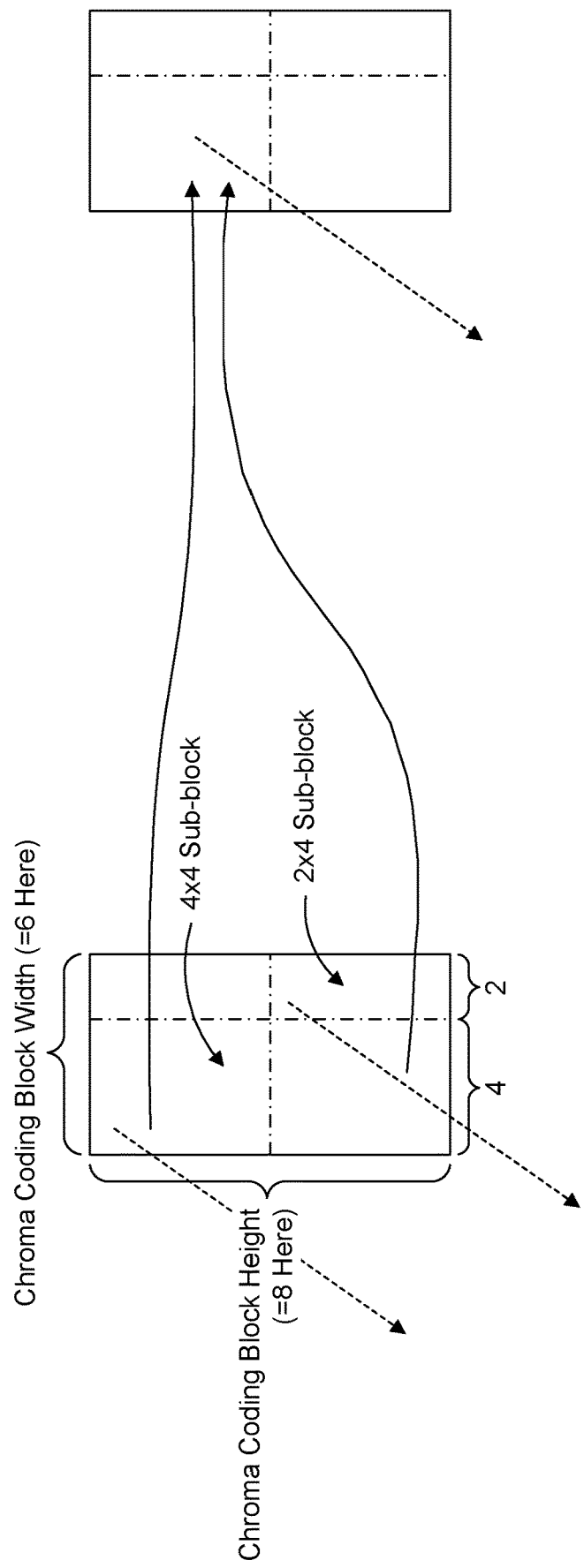
FIG. 22 shows an example computation of an actual motion vector used for the motion compensated temporal prediction of chroma subblocks.

Indeed, in VVC, the affine motion field is represented for the luma component. As a matter of fact, the motion vectors' position for each sub-block correspond to the position of the center of the corresponding luma sub-block. Therefore, these motion vectors, which are used for chroma, have a shifted spatial phase in the chroma component. To handle this, in VVC the average between a sub-block's motion vector and the motion vector of its bottom-right neighboring subblock is computed and the resulting MV is used for the motion compensation for that subblock. This is illustrated in the case of the 6×8 chroma example block in FIG. 22.

Figure 23:
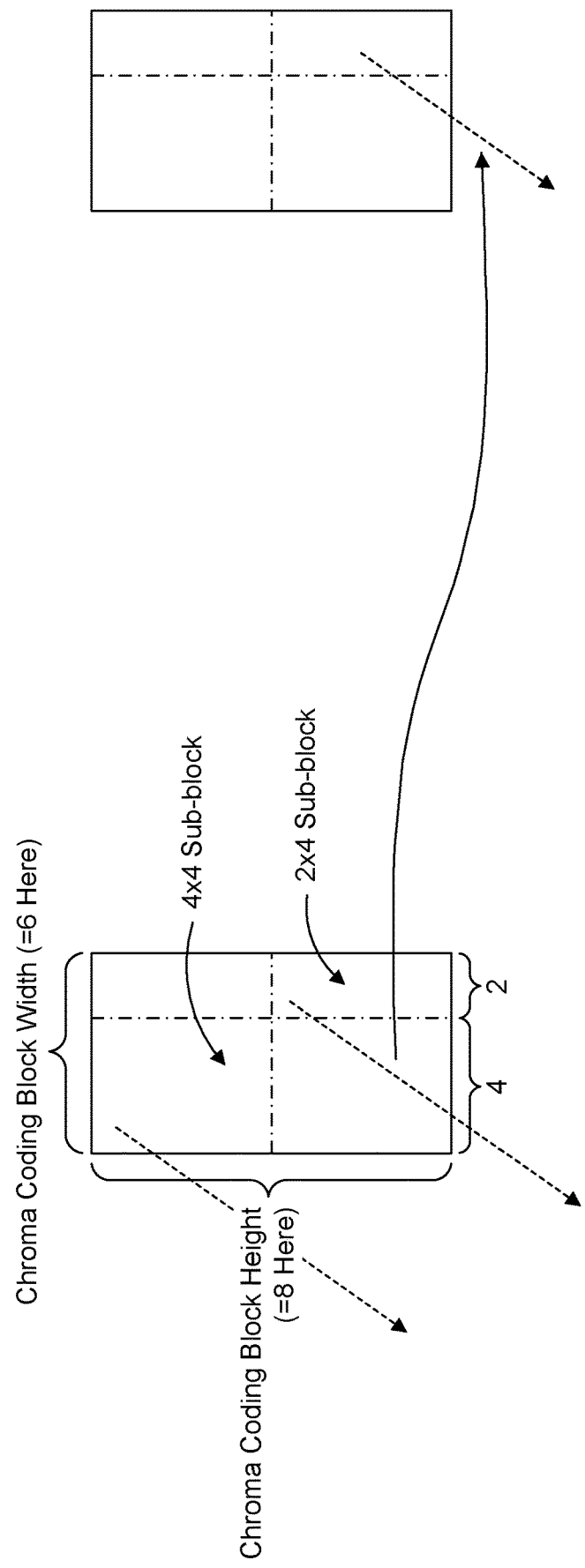
FIG. 23 shows a proposed subblock motion vector assignment to subblocks at the last row of N×6 chroma coding blocks or last column of 6×N chroma coding blocks.
Figure 24:
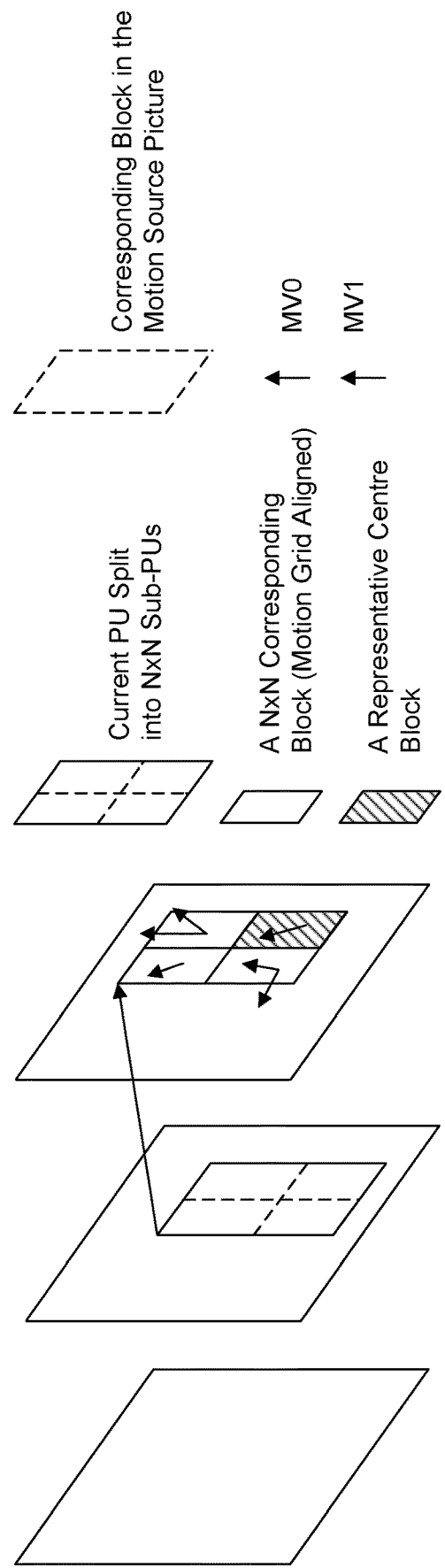
FIG. 24 shows ATMVP motion prediction for a CU in the JEM.

For the last column of subblocks of a chroma coding block with width 6 or of the last row of subblocks in a chroma coding block with height 6, the MV averaging performed in VVC cannot be done. Therefore, it is proposed to use the MV associated to the considered subblocks in such case, as illustrated by FIG. 23.

ABT Combination with Sub-Block Temporal Motion Vector Prediction (SbTMVP)

SbTMVP in VVC

In VVC the Alternative Motion Vector Temporal Prediction, officially called Sub-block Temporal Motion Vector Prediction, consists in the following. The ATMVP motion vector prediction is a specific temporal motion prediction mode in VVC. In the alternative temporal motion vector prediction (ATMVP) method, one or several temporal motion vector predictors for a current CU are retrieved from the reference picture(s) for the current CU.

First, a so-called temporal motion vector and associated reference picture index are obtained as the motion data associated to the first candidate in the usual merge list candidate of current CU.

Figure 13:
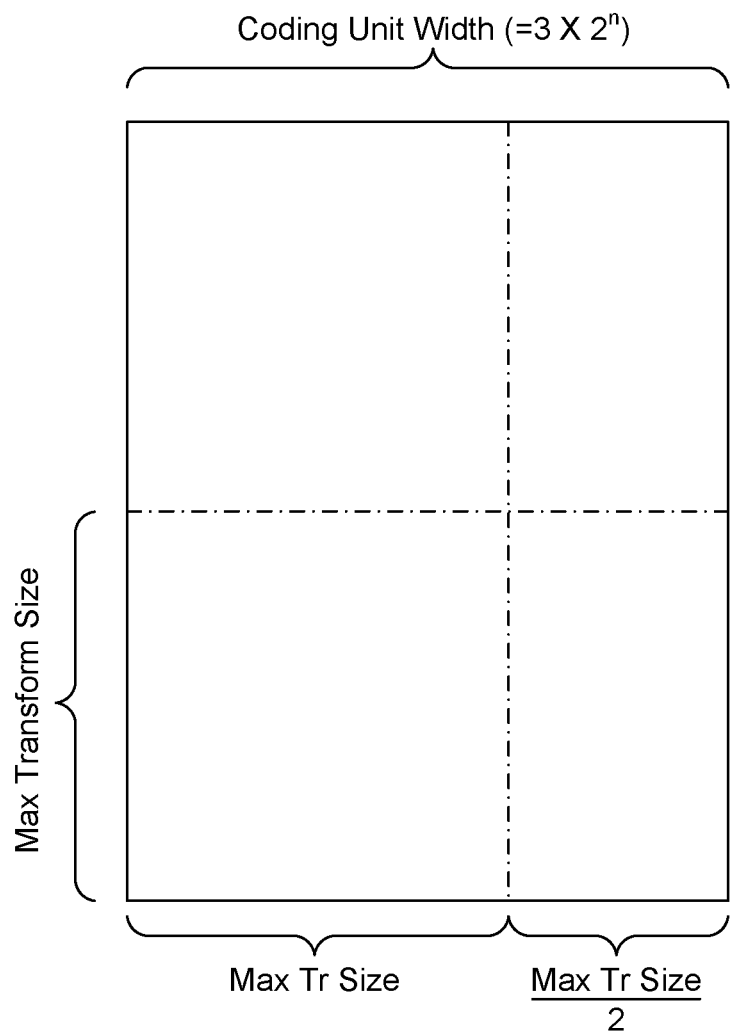
FIG. 13 shows a proposed embodiment for automatic TU tiling in case the CU size si a multiple of three in width or height.

Next, the current CU is divided into N×N sub-CU, N being typically equal to 4. This is shown in FIG. 13. For each N×N sub-block, the motion vector(s) and reference picture indice(s) are identified with the help of the temporal motion vector, in the reference picture associated to the temporal MV. The N×N sub-block in the reference pictures that is pointed to by the temporal MV from the current sub-CU position is considered. Its motion data is taken as the ATMVP motion data prediction for current sub-CU. It is then converted to the motion vectors and reference picture indices of the current sub-CU, through appropriate motion vector scaling.

Combination of SbTMVP and ABT

In VVC, SbTMVP performs motion compensated temporal prediction on an 8×8 subblock basis. As for motion compensation, some adaptation is needed for ABT, particularly in the case of CU size 12 in width or height.

Figure 25:
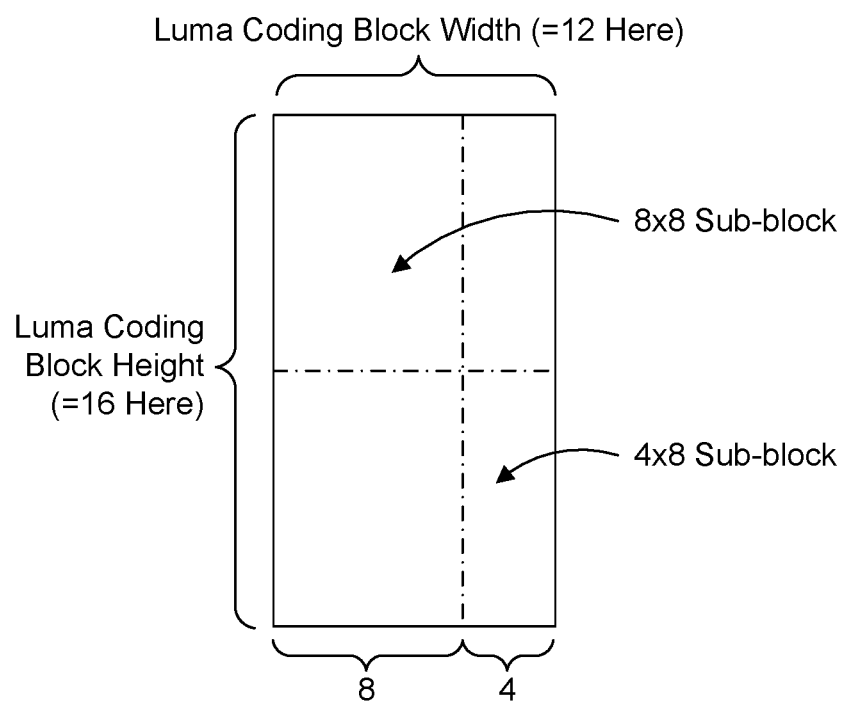
FIG. 25 shows a first proposed method for subblock division for SbTMVP motion compensation.
Figure 26:
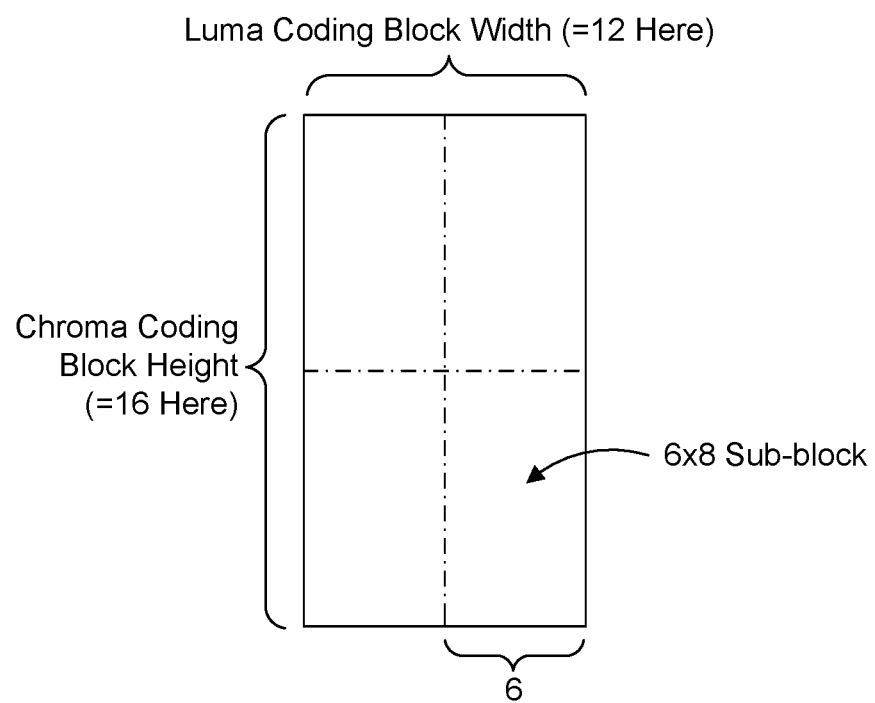
FIG. 26 shows an alternative proposed embodiment for SbTMVP subblock division.
Figure 27:
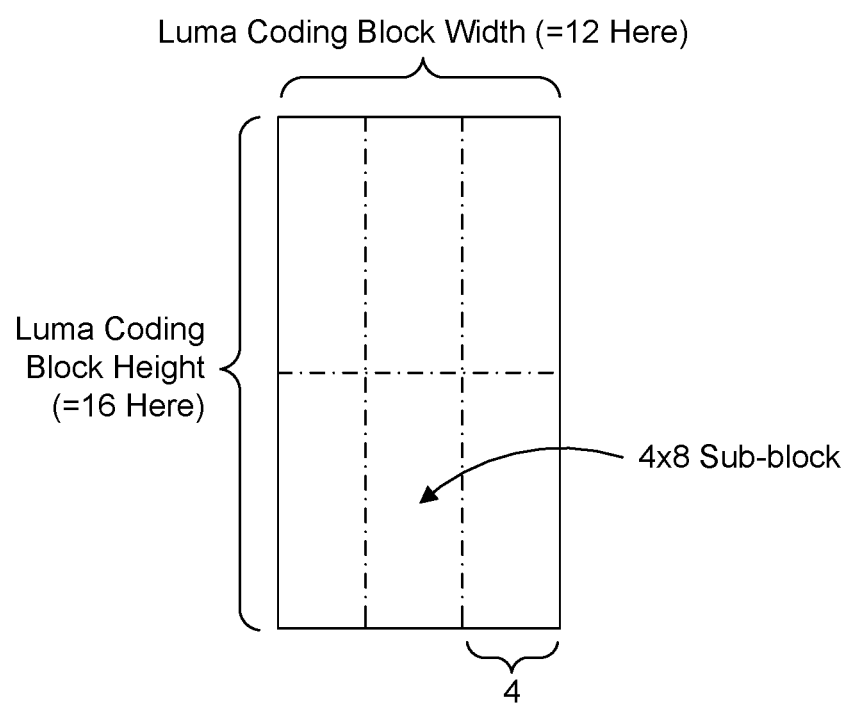
FIG. 27 shows a further alternative method for SbTMVP subblock division.

In such case of a CU of size 12, analogous solutions to those proposed for affine are proposed here. This typically takes the form of one of the subblocks division of FIG. 25, FIG. 26, or FIG. 27.

BDOF (Bi-Directional Optical Flow) Combination with ABT

In VVC, BDOF performs a refinement of inter bi-predicted blocks based on the optical flow.

BDOF applies on luma only, and proceeds on 8×8, 8×16, 16×8 or 16×16 subblocks basis depending on the CU size. It takes the maximum possible sub-blocks size up to 16×16.

Figure 28:
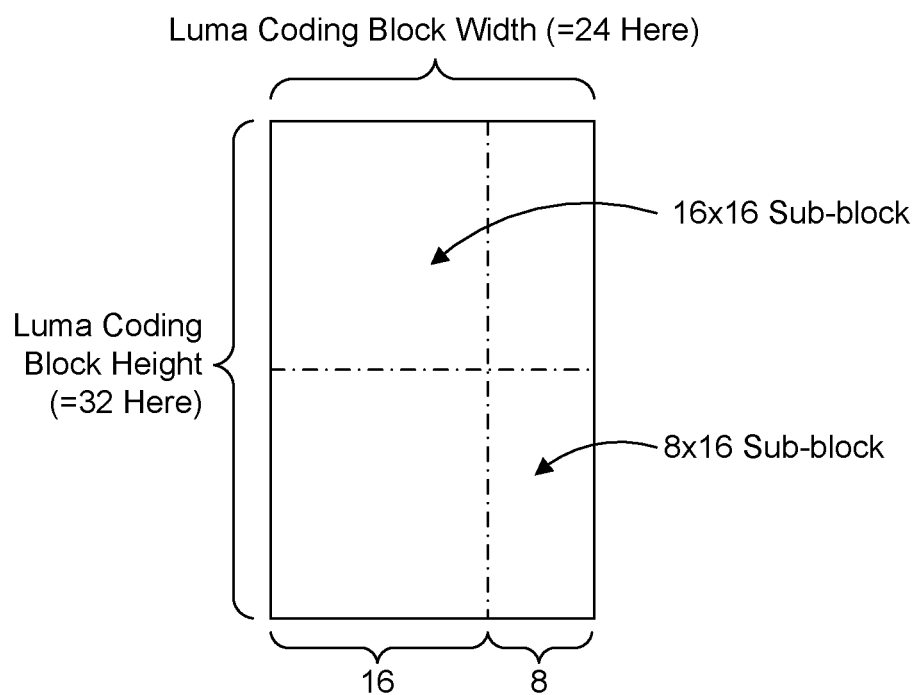
FIG. 28 shows a first proposed method for subblock division for BDOF inter prediction refinement.
Figure 29:
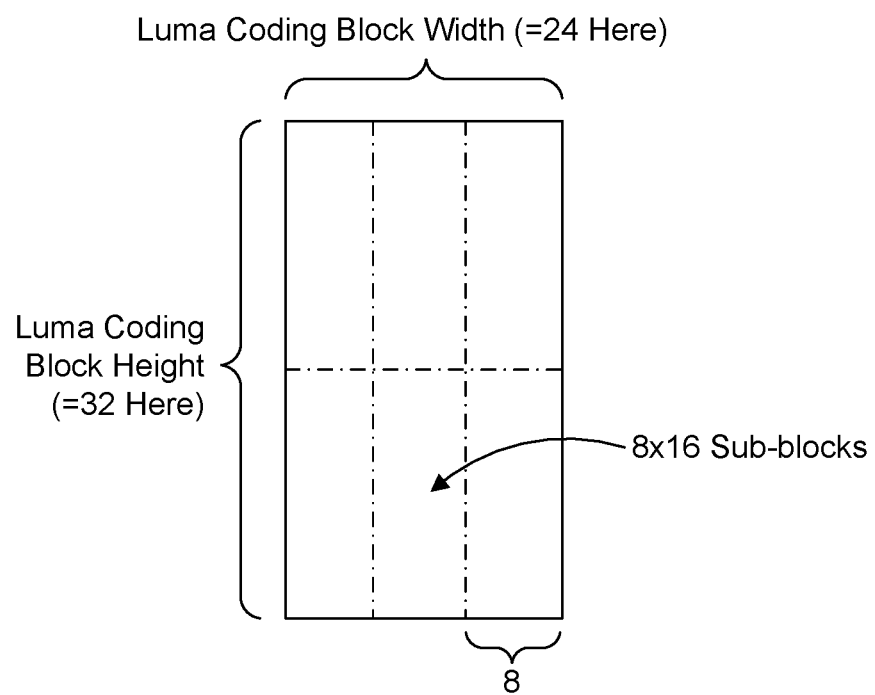
FIG. 29 shows an alternative proposed embodiment for BDOF inter prediction refinement.
Figure 30:
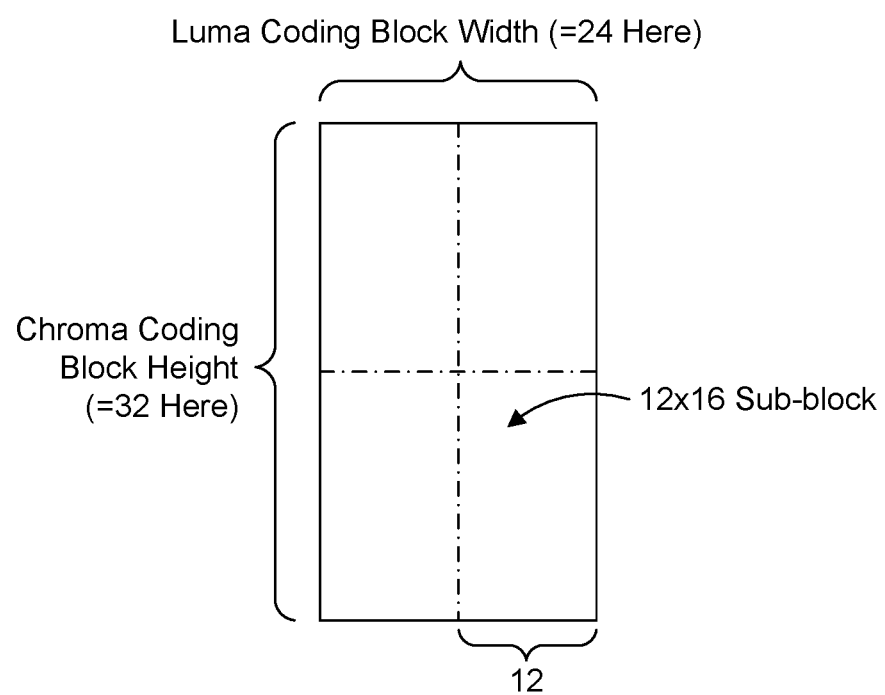
FIG. 30 shows a further alternative method for BDOF inter prediction refinement.

Therefore, for CU sizes likes 24 or 1, introduced by ABT, some subblock division adaptation is needed. The alternative methods proposed here are analogous to those already proposed in the section describing a combination of SbTMVP and ABT, but for a nominal subblock size equal to 16×16. This is respectively illustrated by FIG. 28, FIG. 29, and FIG. 30.

Alternatively, subblock size 4 can be used for luma coding block (CB) size equal to 12, subblock size 8 can be used for luma CB size equal to 24, and subblock size 16 can be used to luma CB sizes 48 and 96. The same rule may apply separately in width and height.

DMVR (Decoder Side Motion Vector Refinement) Combination with ABT

In VVC, DMVR proceeds a bi-direction motion data refinement through a distortion minimization between the two reference blocks of the block currently being predicted.

As for BDOF, the maximum processing unit for DMVR is 16×16, depending on the CU size. DMVR is applied to CU with width and height at least equal to 8 and with a luma area strictly larger than 64 samples.

As a consequence the same alternative methods as those proposed for BDOF are proposed to perform the subdivision into subblocks, to apply DMVR to coding unit with a size equal to 12 or 24. For sizes 48 and 96, the sub block size 16 works properly.

Figure 31:
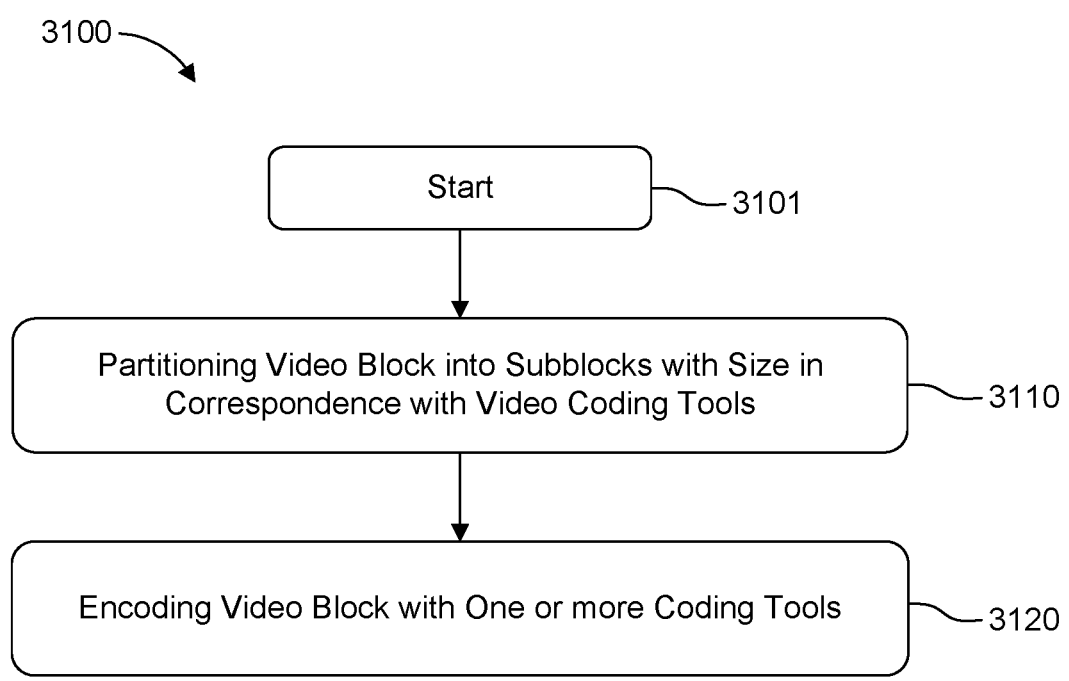
FIG. 31 shows one embodiment of a method under the general described aspects.

One embodiment of a method 3100 under the general aspects described here is shown in FIG. 31. The method commences at start block 3101 and control proceeds to block 3110 for partitioning a block of a video image into subblocks of size in correspondence with one or more coding tools. Control proceeds from block 3110 to block 3120 for encoding the video block using said one or more coding tools.

Figure 32:
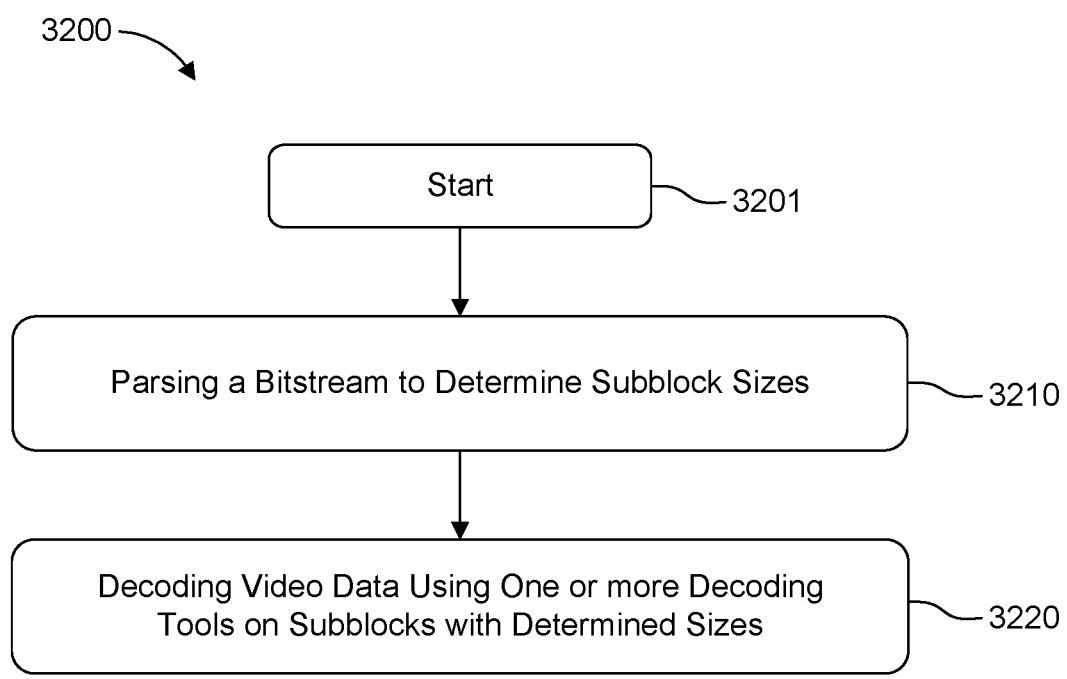
FIG. 32 shows another embodiment of a method under the general described aspects.

One embodiment of a method 3200 under the general aspects described here is shown in FIG. 32. The method commences at start block 3201 and control proceeds to block 3210 for parsing a video bitstream to determine subblock sizes. Control proceeds from block 3210 to block 3220 for decoding the video block using one or more decoding tools on said subblocks of said determined sizes.

Figure 33:
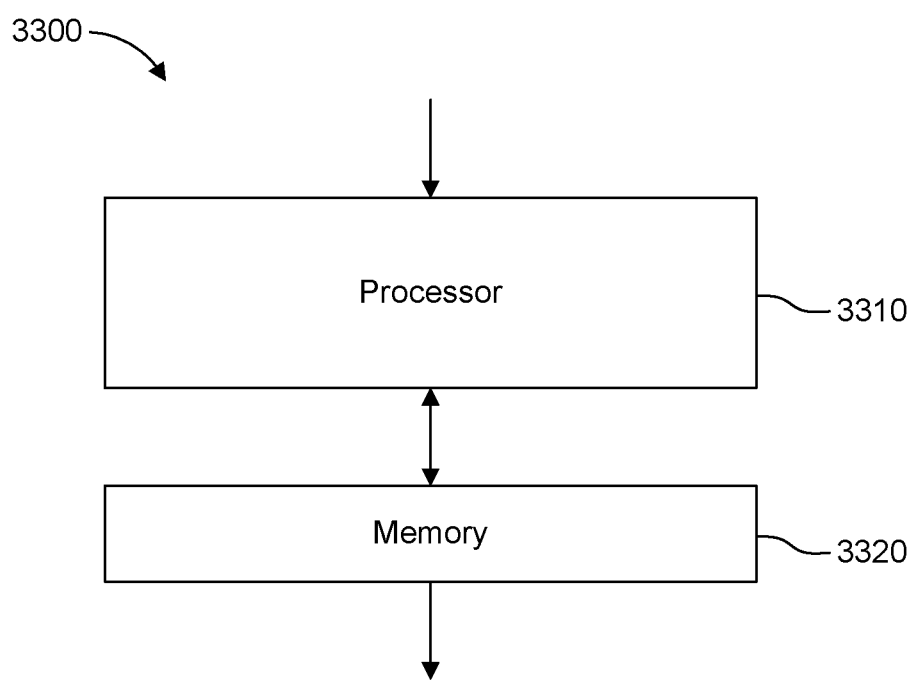
FIG. 33 shows an example apparatus under the described aspects.

FIG. 33 shows one embodiment of an apparatus 3300 for encoding, decoding, compressing or decompressing video data using simplifications of coding modes based on neighboring samples dependent parametric models. The apparatus comprises Processor 3310 and can be interconnected to a memory 3320 through at least one port. Both Processor 3310 and memory 3320 can also have one or more additional interconnections to external connections.

Processor 3310 is also configured to either insert or receive information in a bitstream and, either compressing, encoding or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 10:
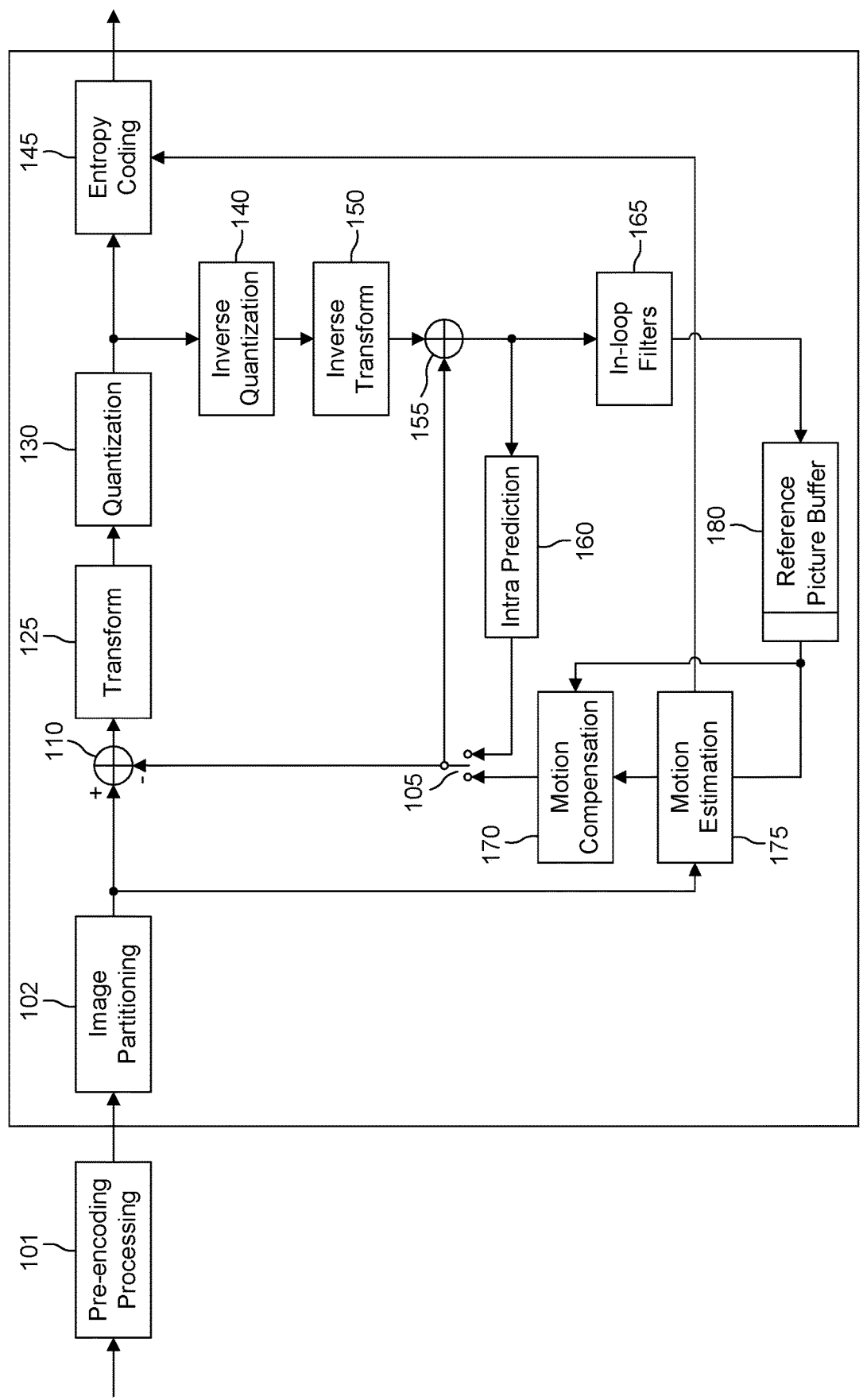
FIG. 10 shows a standard, generic video compression scheme.
Figure 11:
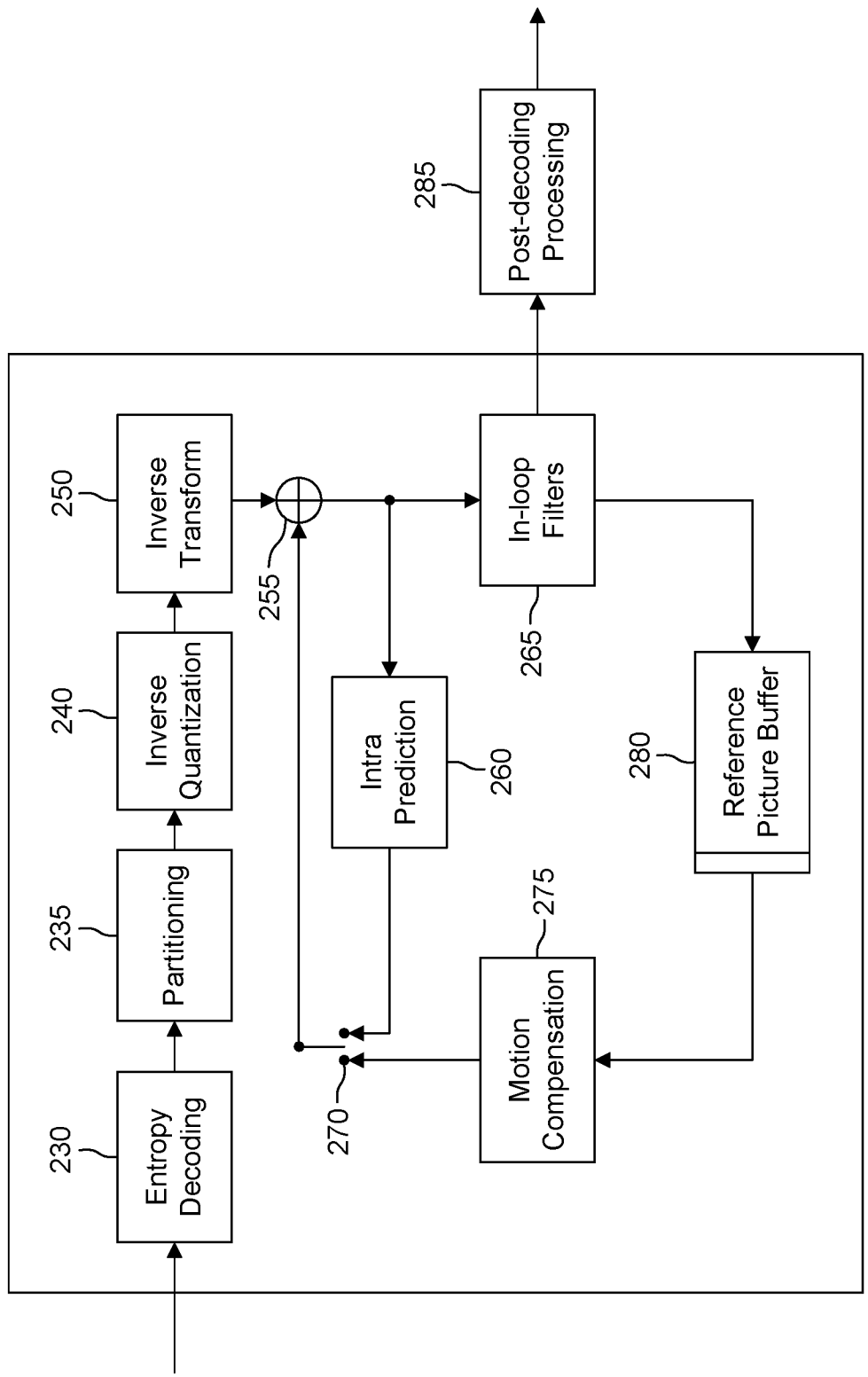
FIG. 11 shows a standard, generic video decompression scheme.
Figure 34:
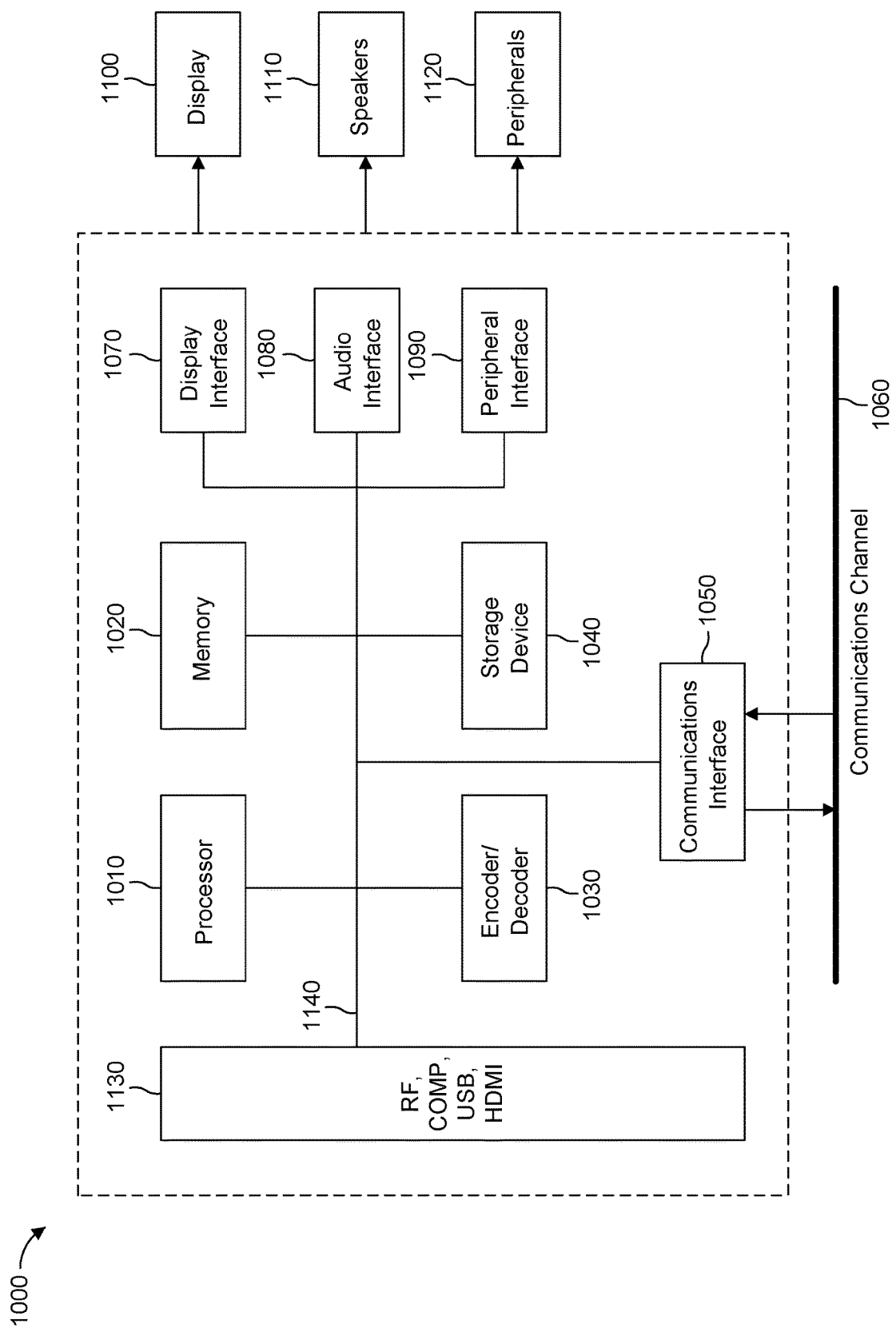
FIG. 34 shows a processor based system for encoding/decoding under the general described aspects.

The aspects described and contemplated in this application can be implemented in many different forms. FIGS. 10, 11, and 34 provide some embodiments, but other embodiments are contemplated and the discussion of FIGS. 10, 11, and 34 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 10 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of a video decoder 200. In the decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 34 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 34, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

- Jointly using asymmetric binary tree partitioning with VVC specific coding tools.
- The above embodiment where the VVC coding tools comprise transform unit tiling, affine motion compensation, decoder side motion vector refinement, and bidirectional optical flow.
- A bitstream or signal that includes one or more of the described syntax elements, or variations thereof.
- A bitstream or signal that includes syntax conveying information generated according to any of the embodiments described.
- Creating and/or transmitting and/or receiving and/or decoding according to any of the embodiments described.
- A method, process, apparatus, medium storing instructions, medium storing data, or signal according to any of the embodiments described.
- Inserting in the signaling syntax elements that enable the decoder to determine decoding information in a manner corresponding to that used by an encoder.
- Creating and/or transmitting and/or receiving and/or decoding a bitstream or signal that includes one or more of the described syntax elements, or variations thereof.
- A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
partitioning a block of a video image into subblocks of size in correspondence with one or more coding tools, wherein the partitioning comprises dividing the block according to a regular grid of sub-blocks of size 2 in a direction where a size of the block is not a power-of-two;
refining inter bi-predicted luminance subblocks based on an optical flow for subblocks up to size 16×16; and
encoding the video block using said one or more coding tools, wherein asymmetric binary tree partitioning is used in combination with subblock temporal motion vector prediction.

2. An apparatus, comprising:
a processor, configured to:
partition a block of a video image into subblocks of size in correspondence with one or more coding tools, wherein the partitioning comprises dividing the block according to a regular grid of sub-blocks of size 2 in a direction where a size of the block is not a power-of-two;
refine inter bi-predicted luminance subblocks based on an optical flow for subblocks up to size 16×16; and
encode the video block using said one or more coding tools, wherein asymmetric binary tree partitioning is used in combination with subblock temporal motion vector prediction.

3. A method, comprising:
parsing a video bitstream to determine subblock sizes, wherein the subblock sizes comprise blocks having been partitioned according to a regular grid of sub-blocks of size 2 in a direction where a size of the block is not a power-of-two;
refining inter bi-predicted luminance subblocks based on an optical flow for subblocks up to size 16×16; and
decoding the video block using one or more decoding tools on said subblocks of said determined sizes, wherein asymmetric binary tree partitioning is used in combination with subblock temporal motion vector prediction.

4. An apparatus, comprising:
a processor, configured to:
parse a video bitstream to determine subblock sizes, wherein the subblock sizes comprise blocks having been partitioned according to a regular grid of sub-blocks of size 2 in a direction where a size of the block is not a power-of-two;
refine inter bi-predicted luminance subblocks based on an optical flow for subblocks up to size 16×16; and
decode the video block using one or more decoding tools on said subblocks of said determined sizes, wherein asymmetric binary tree partitioning is used in combination with subblock temporal motion vector prediction.

5. The method of claim 1, wherein said video coding or decoding tools comprise transform unit tiling, affine motion compensation, decoder side motion vector refinement, and bi-directional optical flow.

6. The method of claim 1, wherein subblocks are chosen to be equal in size.

7. The method of claim 1, wherein coding units are tiled into transform units.

8. The apparatus of claim 2, wherein resulting subblocks are fully contained within a square area corresponding to a regular grid of said video image with a granularity equal to a maximum transform size in width and height.

9. The apparatus of claim 2, wherein a prediction unit is divided into sub-prediction units and a motion model is used to assign each sub-prediction unit to a dedicated motion vector.

10. The apparatus of claim 2, wherein a motion vector and reference picture are identified based on a temporal motion vector in an associated reference picture.

11. The method of claim 3, wherein asymmetric binary tree partitioning is used in combination with subblock temporal motion vector prediction and motion data prediction for a subblock is determined by scaling a Sub-block Temporal Motion Vector Prediction.

12. A device comprising:
an apparatus according to claim 1; and
at least one of (i) an antenna configured to receive a signal, the signal including the video block, (ii) a band limiter configured to limit the received signal to a band of frequencies that includes the video block, and (iii) a display configured to display an output representative of a video block.

13. A non-transitory computer readable medium containing data content generated according to the method of claim 1, for playback using a processor.

14. A computer code program stored in a non-transitory computer-readable storage medium or computer-readable storage memory which, when the program is executed by a computer, cause the computer to carry out the method of claim 1.

15. The method of claim 3, wherein said video coding or decoding tools comprise transform unit tiling, affine motion compensation, decoder side motion vector refinement, and bi-directional optical flow.

16. The method of claim 3, wherein subblocks are chosen to be equal in size.

17. The method of claim 3, wherein coding units are tiled into transform units.

18. The apparatus of claim 4, wherein resulting subblocks are fully contained within a square area corresponding to a regular grid of said video image with a granularity equal to a maximum transform size in width and height.

19. The apparatus of claim 4, wherein a prediction unit is divided into sub-prediction units and a motion model is used to assign each sub-prediction unit to a dedicated motion vector.

20. The apparatus of claim 4, wherein a motion vector and reference picture are identified based on a temporal motion vector in an associated reference picture.

* * * * *